US 7,849,080 B2

(12) United States Patent
Chang et al.

(10) Patent No.: US 7,849,080 B2
(45) Date of Patent: Dec. 7, 2010

(54) SYSTEM FOR GENERATING QUERY SUGGESTIONS BY INTEGRATING VALUABLE QUERY SUGGESTIONS WITH EXPERIMENTAL QUERY SUGGESTIONS USING A NETWORK OF USERS AND ADVERTISERS

(75) Inventors: Chi-Chao Chang, Santa Clara, CA (US); Manish Tayal, Santa Clara, CA (US); Tasos Anastasakos, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 359 days.

(21) Appl. No.: 11/830,753

(22) Filed: Jul. 30, 2007

(65) Prior Publication Data

US 2008/0256061 A1 Oct. 16, 2008

Related U.S. Application Data

(63) Continuation of application No. 11/786,326, filed on Apr. 10, 2007.

(51) Int. Cl.
*G06F 17/30* (2006.01)

(52) U.S. Cl. ........................ 707/723; 707/706; 707/767; 707/751; 707/E17.014; 709/218

(58) Field of Classification Search .................. 707/3–5, 707/E17.017, 999.005, 706, 748, 767, 751, 707/E17.014; 709/218
See application file for complete search history.

(56) References Cited

U.S. PATENT DOCUMENTS

| 6,006,225 | A | * | 12/1999 | Bowman et al. | ................ 707/5 |
| 6,098,065 | A | * | 8/2000 | Skillen et al. | ................... 707/3 |
| 6,564,213 | B1 | * | 5/2003 | Ortega et al. | ................... 707/5 |
| 6,876,997 | B1 | | 4/2005 | Rorex et al. | ..................... 707/3 |
| 6,947,930 | B2 | * | 9/2005 | Anick et al. | ................... 707/5 |
| 7,225,182 | B2 | | 5/2007 | Paine et al. | ..................... 707/3 |
| 7,542,969 | B1 | | 6/2009 | Rappaport et al. | |

(Continued)

OTHER PUBLICATIONS

Hang Cui et al.; *"Probabilistic Query Expansion Using Query Logs"*; WWW 2002, May 7-11, 2002; Honolulu, Hawaii, USA; ACM 1-58113-449-5/02/0005; 9 pages.

(Continued)

*Primary Examiner*—Tim T. Vo
*Assistant Examiner*—Shiow-Jy Fan
(74) *Attorney, Agent, or Firm*—Brinks Hofer Gilson & Lione

(57) ABSTRACT

A system is described for generating query suggestions by integrating valuable query suggestions with experimental query suggestions using a network of users and advertisers. The system may include a memory, an interface, and a processor. The memory may store a historical dataset, a plurality of query suggestions, a plurality of query suggestion values, a query exploit set, a query explore set, and a data describing a network. The processor may identify the plurality of query suggestions in the historical dataset and generate data describing the network based on the historical dataset. The processor may calculate the query suggestion value for each query suggestion and may rank the query suggestions based on the query suggestion values. The processor may generate an exploit set comprising the top ranked query suggestions and an explore set comprising the remainder. The processor may suggest the query suggestions in the exploit set and the explore set.

20 Claims, 15 Drawing Sheets

U.S. PATENT DOCUMENTS

| | | | |
|---|---|---|---|
| 2003/0046161 | A1 | 3/2003 | Kamangar et al. |
| 2003/0055816 | A1 | 3/2003 | Paine et al. |
| 2004/0024752 | A1 | 2/2004 | Manber et al. |
| 2005/0015366 | A1 | 1/2005 | Carrasco et al. |
| 2005/0021397 | A1 | 1/2005 | Cui et al. |
| 2005/0131758 | A1 | 6/2005 | Desikan et al. |
| 2005/0137939 | A1 | 6/2005 | Calabria et al. |
| 2006/0206516 | A1 | 9/2006 | Mason |
| 2006/0248035 | A1 | 11/2006 | Gendler et al. |
| 2006/0287919 | A1* | 12/2006 | Rubens et al. ............... 705/14 |
| 2007/0027754 | A1 | 2/2007 | Collins et al. |
| 2007/0027864 | A1 | 2/2007 | Collins et al. ............... 707/5 |
| 2007/0027865 | A1 | 2/2007 | Bartz et al. ............... 707/5 |
| 2007/0027869 | A1 | 2/2007 | Collins |
| 2007/0156887 | A1 | 7/2007 | Wright et al. |
| 2007/0174258 | A1 | 7/2007 | Jones et al. |
| 2007/0282813 | A1* | 12/2007 | Cao et al. ............... 707/3 |
| 2008/0154738 | A1 | 6/2008 | Jain et al. |
| 2008/0208841 | A1 | 8/2008 | Zeng et al. |

OTHER PUBLICATIONS

Brian D. Davison et al.; "*Finding Relevant Website Queries*"; Department of Computer Sciences & Engineering, Lehigh University; WWW2003, May 20-24, 2003, Budapest, Hungary; 2 pages.

Deborah Fallows, PhD; Pew/Internet, Pew Internet & American Life Project; Search Engine Users, *Internet searchers are confident, satisfied and trusting-but they are also unaware and naïve.*; Embargoed for publication until 4pm, Jan. 23, 2005.

Trevor Hastie, et al., "*The Elements of Statistical Learning*", Data Mining, Inference, and Prediction, Springer Series in Statistics. Springer-Verlag, New York, 2001.

Wikipedia, "Bipartite Graph," pp. 1-3 at: http://en.wikipedia.org/wiki/Bipartite_graph (last visited Jul. 9, 2007).

Wikipedia, "Collaborative Filtering," pp. 1-7 at: http://en.wikipedia.org/wiki/Collaborative_filtering (last visited Jul. 9, 2007).

Wikipedia, "Jaccard Index," pp. 1-3 at: http://en.wikipedia.org/wiki/Jaccard_index (last visited Jul. 9, 2007).

Wikipedia, "K-means Algorithm," pp. 1-4 at: http://en.wikipedia.org/wiki/K-means_algorithm (last visited Jul. 9, 2007).

Wikipedia, "Pearson Product-Moment Correlation Coefficient," pp. 1-2 at: http://en.wikipedia.org/wiki/Pearson_product-moment_correlation_coefficient (last visited Jul. 9, 2007).

Office Action mailed Oct. 15, 2009 for U.S. Appl. No. 11/830,679, 17 pages.

Office Action mailed Apr. 26, 2010 for U.S. Appl. No. 11/786,326, 13 pages.

Office Action mailed May 25, 2010 for U.S. Appl. No. 11/830,693, 20 pages.

Office Action dated May 27, 2010 for U.S. Appl. No. 11/830,515, 17 pages.

Office Action mailed Jun. 23, 2010 for U.S. Appl. No. 11/830,726, 21 pages.

* cited by examiner

FIG. 14

SYSTEM FOR GENERATING QUERY SUGGESTIONS BY INTEGRATING VALUABLE QUERY SUGGESTIONS WITH EXPERIMENTAL QUERY SUGGESTIONS USING A NETWORK OF USERS AND ADVERTISERS

CROSS-REFERENCE TO RELATED APPLICATIONS

The present application is a continuation of U.S. patent application Ser. No. 11/786,326, filed Apr. 10, 2007 (pending), which is incorporated by reference herein.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

The present description relates generally to a system and method, generally referred to as a system, for generating query suggestions by integrating valuable query suggestions with experimental query suggestions using a network of users and advertisers.

BACKGROUND

Online advertising may be an important source of revenue for enterprises engaged in electronic commerce. The advent of search engines may have resulted in an increase in the use of sponsored search, or paid search, by advertisers. Sponsored search may be an arrangement where companies and/or individuals pay a service provider for placement of their advertisement listing. The advertisement listing may be placed in a search result set generated by the service provider's search engine or may be placed on a page of a partner of the service provider, e.g., a blog. An advertiser may place bids for one or more keywords within a search term bidding marketplace that may work in conjunction with one or more search engines. An advertiser may bid on keywords that may indicate an interest in the products, services, information, etc. being advertised in the advertisement. The amount an advertiser may bid on the keywords may indicate the cost the advertiser may be willing to pay for placement of the advertisement.

A user may submit a query comprising one or more keywords to a search engine and the search engine may produce a result set comprising one or more listings that may fall within the scope of the query, including sponsored search listings. The search engine may use the keywords, as well as other features such as user and advertiser information, to select sponsored search listings for inclusion in the result set. The user may generate a lead for an advertiser when the user selects the sponsored listing of the advertiser, such as by clicking on the advertisement.

Search engines may strive to maintain an increasing supply of users to deliver valuable leads to advertisers and advertisers, in turn, may demand a growing supply of leads from search engines. This may result in growth of search engine usage and online advertising budgets. Search engines may retain and increase their supply of users by providing relevant web search results and advertising. Advertisers may increase their demand of leads as lead quality and targeting improve. A marketplace therefore may exist that includes a given keyword, the set of one or more users who may provide search queries comprising the keyword over a given period of time ("lead supply") and the advertisers who may compete for leads (or clicks) for the given keyword. Search engines or other advertisement providers may use the above-described term bidding marketplace, which is a form of an auction, to allocate leads to advertisers.

In a "dense" marketplace, advertiser demand may exceed the supply of leads. The auction may be designed such that advertisers who are most relevant to the keyword, and/or value the lead the most, may place the highest bid on the keyword. In "shallow" or "sparse" marketplaces, advertiser demand may not exceed the supply of leads. A shallow marketplace may have limited leads because the marketplace may be characterized by multiple keyword phrases, as well as keywords that may be obscure and/or may have a very narrow context or intent. Since there may be only a small number of advertisers bidding for these keywords, the average cost per click for a given lead may be generally low. Advertisers may bombard search engines with low bids for a large number of such keywords to capture opportunities in shallow marketplaces. The imbalances of supply and demand may lead to inadequate overall relevance to users and a lack of competition among advertisers, ultimately resulting in a decrease in revenue to the service provider.

Furthermore the term-bidding marketplace may require advertisers to predict keywords or queries that may be searched for by users. If a user searches for a keyword or query which has not been bid on by any advertisers, the search engine may not display any advertisements to the user. If a search results page is displayed to a user with no advertisements, there may be little likelihood of leads for the advertisers and revenue for the search engine provider.

SUMMARY

A system for generating query suggestions by integrating valuable query suggestions with experimental query suggestions using a network of users and advertisers may include a memory, an interface, and a processor. The memory may be operatively connected to the processor and the interface and may store a historical dataset, a plurality of query suggestions, a plurality of query suggestion values, a query exploit set, a query explore set, and a data describing a network. The data describing the network may comprise a plurality of query items representing queries linked to a plurality of advertisement items representing advertisements. The interface may be operatively connected to the memory and the processor and may be operative to communicate query suggestions. The processor may be operatively connected to the memory and the interface and may identify the plurality of query suggestions in the historical dataset and generate the data describing the network based on the historical dataset. The processor may calculate the query suggestion value for each query suggestion in the plurality of query suggestions using the data describing the network. The processor may rank the plurality of query suggestions, in descending order, based on the query suggestion value of each query suggestion. The processor may then generate a query exploit set comprising the top ranked query suggestions and a query explore set comprising the remainder of the query suggestions. The processor may suggest, via the interface, the query suggestions in the exploit set and the explore set. The processor may suggest the query suggestions in the exploit set more frequently than the query suggestions in the explore set.

Other systems, methods, features and advantages will be, or will become, apparent to one with skill in the art upon examination of the following figures and detailed description. It is intended that all such additional systems, methods, features and advantages be included within this description, be within the scope of the embodiments, and be protected by the following claims and be defined by the following claims. Further aspects and advantages are discussed below in conjunction with the description.

BRIEF DESCRIPTION OF THE DRAWINGS

The system and/or method may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

FIG. 14 is a screenshot of a search results page displaying advertisements.

DETAILED DESCRIPTION

Figure 1:
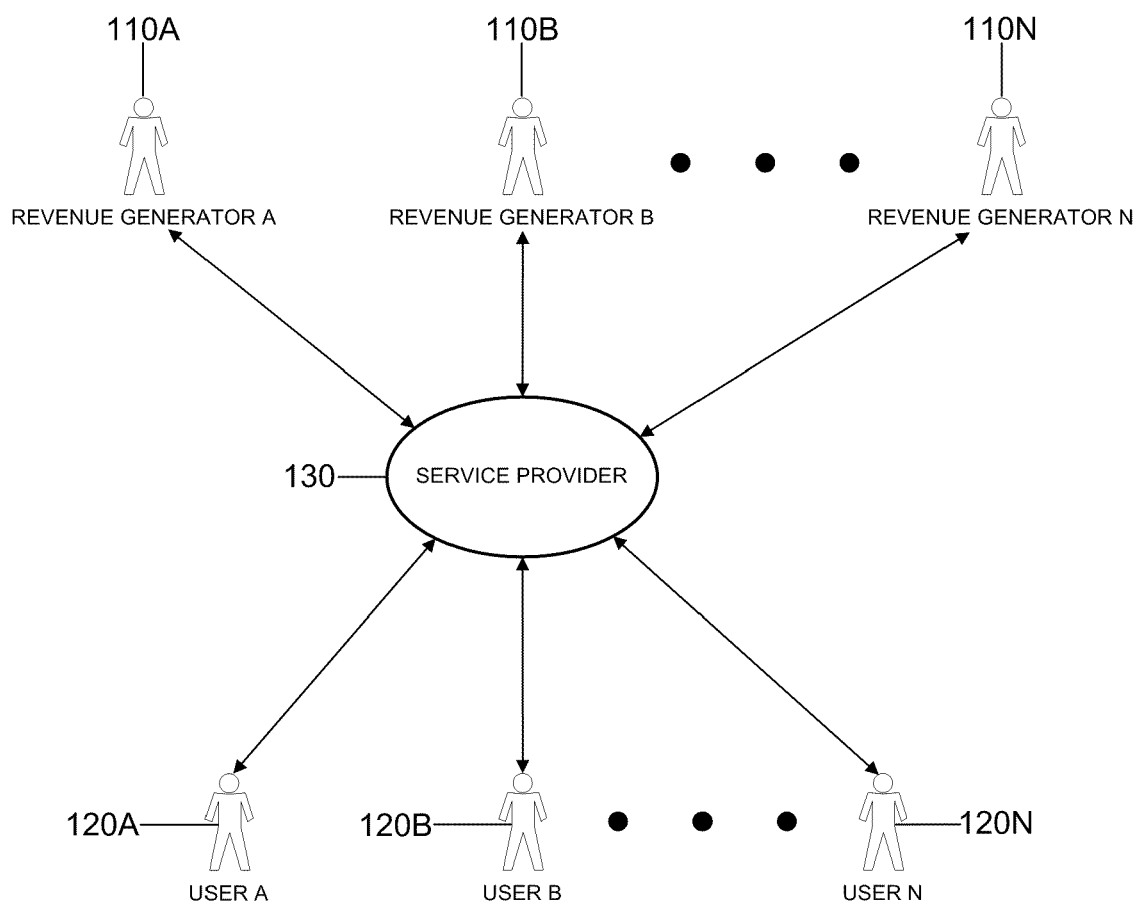
FIG. 1 is a block diagram of a system for generating query suggestions using a network of users and advertisers.

A system and method, generally referred to as a system, may relate to generating query suggestions by integrating valuable query suggestions with experimental query suggestions using a network of users and advertisers. The principles described herein may be embodied in many different forms.

The system may build a data structure representing a network of users and advertisers based on advertiser intent described by target queries, valuation and spend, as well as historical user behavior described by queries, user profiles and other context. A query may refer to a set of terms searched for by a user or a set of terms related to the content of a page, such as a web page displayed to a user. The network may be independent of the language and other regional characteristics of the underlying data, enabling a plurality of networks to be combined across markets defined by language and other regional characteristics.

The network may be used to identify advertisements to be served by a search engine, such as supplemental advertisements related to the user's search query. The network may be used to estimate the relative quality of advertisements and evolve a quality benchmark, such as a quality benchmark based on advertisement performance and/or user feedback. The additional advertisements may increase the depth and competitiveness of shallow keywords by eliciting/inducing more overall user attention.

The network may further be used to generate keyword suggestions to be queried at advertisement serving time, and/or to be presented to advertisers during campaign management. The network may be used to evaluate the quality (relevance, value) of keywords suggested through the use of the network, and keywords suggested through other matching techniques, in the first and higher orders. The network may be used to utilize high quality keyword suggestions and further to explore unknown or low value suggestions scheduled by some measure based on a relevance model. The keyword suggestions may increase the depth and competitiveness of shallow keywords by eliciting/inducing more overall user attention.

The network may be utilized in several ways to suggest keywords and identify advertisements. The network may be used capture the semantic knowledge gap between raw user queries (often syntactically different) and underlying implicit user intent in an automated, non-intrusive, implicit way. The captured semantic knowledge gap may be utilized to suggest keywords and/or identify advertisements.

The network may be analyzed to identify both significantly unrelated and significantly related sub-networks based on some affinity measure, such as keyword semantic affinities, advertiser online spent, and past historical performance based on user clicks and/or revenue generated. The sub-network relationships may be utilized to suggest keywords and/or identify advertisements.

The network may be extendable to account for new emerging forms of advertisement performance feedback, such as clicks, various forms of conversions, and/or any other metric for measuring advertisement performance. Single or multiple forms of advertisement feedback may be translated into semantic knowledge. The semantic knowledge may be utilized to suggest keywords and/or identify advertisements.

The network may be adaptable to account for temporal increments given increasing advertiser participation, changes in advertiser intent, valuation and online spend, changes in user behavior, demographics and mix, changes in aggregate user intent, search usage, and mix. The adapted network may be capable of capturing temporal shifts in user intent, advertiser intent and/or other context and a corresponding shift in the underlying semantic knowledge. The shift in semantic knowledge may be utilized to suggest keywords and/or identify advertisements, such as by implicitly capturing language seasonal patterns, and language usage patterns.

FIG. 1 provides a general overview of a system 100 for generating query suggestions using a network of users and advertisers. Not all of the depicted components may be required, however, and some implementations may include additional components. Variations in the arrangement and type of the components may be made without departing from the spirit or scope of the claims as set forth herein. Additional, different or fewer components may be provided.

The system 100 may include one or more revenue generators 110A-N, such as advertisers, a service provider 130, such as a search engine marketing service provider, and one or more users 120A-N, such as web surfers or consumers. The service provider 130 may implement an advertising campaign management system incorporating an auction based and/or non-auction based advertisement serving system. The revenue generators 110A-N may pay the service provider 130 to serve, or display, advertisements of their goods or services, such as on-line advertisements, on a network, such as the Internet. The advertisements may include sponsored listings, banners ads, popup advertisements, or generally any way of attracting the users 120A-N to the web site of the revenue generators 110A-N.

The amount the revenue generators 110A-N may pay the service provider 130 may be based on one or more factors. These factors may include impressions, click throughs, conversions, and/or generally any metric relating to the advertisement and/or the behavior of the users 120A-N. The impressions may refer to the number of times an advertisement may have been displayed to the users 120A-N. The click throughs may refer to the number of times the users 120A-N may have clicked through an advertisement to a web site of one of the revenue generators 110A-N, such as the revenue generator A 110A. The conversions may refer to the number of times a desired action was taken by the users 120A-N after clicking though to a web site of the revenue generator A 110A. The desired actions may include submitting a sales lead, making a purchase, viewing a key page of the site, downloading a whitepaper, and/or any other measurable action. If the desired action is making a purchase, then the revenue generator A 110A may pay the service provider 130 a percentage of the purchase.

The users 120A-N may be consumers of goods or services who may be searching for a business, such as the business of one of the revenue generators 110A-N. Alternatively or in addition the users 120A-N may be machines or other servers, such as the third party server 250. The users 120A-N may supply information describing themselves to the service provider 130, such as the location, gender, or age of the users 120A-N, or generally any information that may be required for the users 120A-N to utilize the services provided by the service provider 130.

In the system 100, the revenue generators 110A-N may interact with the service provider 130, such as via a web application. The revenue generators 110A-N may send information, such as billing, website and advertisement information, to the service provider 130 via the web application. The web application may include a web browser or other application, such as any application capable of displaying web content. The application may be implemented with a processor such as a personal computer, personal digital assistant, mobile phone, or any other machine capable of implementing a web application.

The users 120A-N may also interact individually with the service provider 130, such as via a web application. The users 120A-N may interact with the service provider 130 via a web based application or a standalone application. The service provider 130 may communicate data to the revenue generators 110A-N and the users 120A-N over a network. The following examples may refer to a revenue generator A 110A as an online advertiser; however the system 100 may apply to any revenue generators 110A-N who may benefit from a network of users and advertisers, such as a service provider partner.

One example of a service provider partner may be a content publisher. Content publishers may be service provider partners who may display content, such as news articles, videos, or any other type of content to the users 120A-N. Along with the content, content publishers may display advertisements of the advertisers to the users 120A-N. The service provider 130 may supply the advertisements to the content publishers. The advertisements may relate to the content displayed on the page, or the advertisements may relate to the characteristics, demographics and/or login-profiles of the users 120A-N. When the users 120A-N interact with an advertisement of one of the advertisers, the advertisers may pay the service provider 130. The service provider 130 may in turn pay the content publisher. Thus the revenue generators 110A-N may include one or more content publishers, advertisers, and/or other service provider partners.

In operation, one of the revenue generators 110A-N, such as revenue generator A 110A, may provide information to the service provider 130. This information may relate to the transaction taking place between the revenue generator A 110A and the service provider 130, or may relate to an account the revenue A 110A generator maintains with the service provider 130. In the case of a revenue generator A 110A who is an online advertiser, the revenue generator A 110A may provide initial information necessary to open an account with the service provider 130. The revenue generators 110A-N may implement one or more advertising tactics with the service provider 130 to target advertisements to the users 120A-N and/or the revenue generators 110A-N may authorize the service provider 130 to use any advertising tactic, or method, to display their advertisements to the users 120A-N.

One example of an advertising tactic may be sponsored search, such as targeting advertisements to search terms or keywords. Sponsored search may operate within the context of an auction-based system or marketplace that may be used by the revenue generators 110A-N to bid for search terms or queries. When the terms are used in a search, the ad listings or links of a revenue generator, such as the revenue generator A 110A, may be displayed among the search results. Revenue generators 110A-N may further bid for position or prominence of their listings in the search results. With regard to auction-based sponsored search, the revenue generator A 110A may provide a uniform resource locator (URL) for the webpage to which the ad may take the users 120A-N to if clicked on. The revenue generator A 110A may also provide the text or creative of the advertisement that may be displayed in connection with the URL. A revenue generator A 110A may identify one or more terms that may be associated with the advertisement.

Another example of an advertising tactic may be content matching. Content match advertisements may be used by the revenue generator A 110A to complement, or as alternative to, the sponsored search tactic. Ads stored according to the content match tactic may be displayed alongside relevant articles, product reviews, etc, presented to the users 120A-N by the service provider 130 or a service provider partner, such as a content publisher. The system 100 may implement a content matching system. The content matching system may process the words on a given page to determine a set of terms. The set of terms may be the most commonly occurring words, or may be determined by some other factor. The set of terms may then be used to determine which of the content match advertisements to display. The content matching system may use the set of terms to select advertisements, such as by selecting the advertisements which contain the most number of words matching the set of terms. The set of terms may be referred to as a query or a content match query.

Content match advertisements may be displayed on any web page containing content relevant to the advertisement. For the content match tactic, the revenue generator A 110A may provide one or more URLs identifying the address of a webpage a given ad may take the users 120A-N to if clicked on. The revenue generator A 110A may also provide the text, image, video or other type of multimedia comprising the creative portion of the advertisement that may be displayed next to the URL.

Another example of an advertising tactic may be a banner advertisement or popup advertisement. The banner ad and/or popup ad tactic may be used by the revenue generators 110A-N to complement, or as alternative to, the sponsored search tactic and the content match tactic. In contrast to the sponsored search tactic and content match tactic, which may be based on a pay-per-click payment scheme, a revenue generator 110A-N may pay for every display of a banner ad and/or popup ad, referred to as an impression. Alternatively, if the banner ad and/or popup ad displays a phone number, a revenue generator, such as the revenue generator A 110A may only be billed if a user, such as the user A 120A, calls the phone number associated with the advertisement ("pay-per-call"). Thus, for the banner ad and/or popup ad tactic, the revenue generator A 110A may provider a URL to the webpage where the ad may take the user A 120A if clicked on, as well as the creative or the given banner ad and/or popup ad.

A revenue generator A 110A who is an online advertiser may maintain several accounts with the service provider 130. For each account the revenue generator A 110A may maintain several advertising campaigns, such as an MP3 player campaign, a car campaign, or any other distinguishable category of products and/or services. Each campaign may include one or more ad groups. The ad groups may further distinguish the category of products and/or services represented in the advertising campaign, such as by search tactic, performance parameter, demographic of user, family of products, or almost any other parameter desired by the revenue generators 110A-N.

For example, if the advertising campaign is for MP3 Players, there may be an ad group each brand of MP3 players, such as APPLE IPOD® or MICROSOFT ZUNE®. Allowing the revenue generators 110A-N to determine their own ad groups may allow the service provider 130 to provide more useful information to the revenue generators 110A-N. The revenue generators 110A-N may thereby display, manage, optimize, or view reports on, advertisement campaign information in a manner most relevant to a revenue generator, such as the revenue generator A 110A.

The ad groups may include one or more listings. A listing may include a title, a description, one or more search keywords, an advertisement, a destination URL, and a bid amount. A listing may represent an association between the one or more search keywords identified by the revenue generator A 110A, and an advertisement of the revenue generator A 110A.

The title may be the name of the product being advertised, such as "JEEP WRANGLER®." The description may describe the product being advertised. For example, if DAIMLERCHRYSLER® wished to advertise a DAIMLERCHRYSLER JEEP WRANGLER®, the listing may have a description of "DAIMLERCHRYSLER JEEP WRANGLER®," "JEEP WRANGLER®," or "5 PASSENGER JEEP WRANGLER®."

The destination URL may represent the link the revenue generator A 110A wishes a user A 120A to be directed to upon clicking on the advertisement of the revenue generator A 110A, such as the home page of the revenue generator A 110A. The bid amount may represent a maximum amount the revenue generator A 110A may be willing to pay each time a user A 120A may click on the advertisement of the revenue generator A 110A or each time the advertisement of the revenue generator A 110A may be shown to a user A 120A.

The keywords may represent one or more search terms that the revenue generator A 110A may wish to associate their advertisement with. When a user A 120A searches for one of the listing's keywords, the advertisement of the revenue generator A 110A may be displayed on the search results page.

For example, a revenue generator A 110A, such as DAIMLERCHRYSLER®, may desire to target an online advertisement for a CHRYSLER JEEP WRANGLER® to users 120A-N searching for the keywords "JEEP®", "WRANGLER®", or "JEEP WRANGLER®". DAIMLERCHRYSLER® may place a bid with the service provider 130 for the search keywords "JEEP®", "WRANGLER®", and "JEEP WRANGLER®" and may associate the online advertisement for a DAIMLERCHRYSLER JEEP WRANGLER® with the keywords. The advertisement of the revenue generator A 110A may be displayed when one of the users 120A-N searches for the keywords "JEEP®", "WRANGLER®", or "JEEP WRANGLER®".

Alternatively or in addition, the service provider 130 may implement a query suggestion system. A query suggestion system may perform an analysis on the query of the user A 120A, or the query determined from, or related to, the content of page, such as a web page displayed to the user A 120A, to find additional queries that may relate to the query of the user A 120A, or the query determined from the content of a page. If additional queries are found, advertisements with bids on any of the additional queries may be displayed to the user A 120A in addition to the advertisements with bids on the original query. Thus the user A 120A may click on an advertisement of a revenue generator A 110A who did not bid on the query the user A 120A searched for, or the query determined from the content of a page, but a query matched, by a query suggestion system, to the query searched for by the user A 120A. Some examples of query suggestion systems may include King Kong, SPM, MOD, Units, or query suggestions derived from a network of users and advertisers.

More detail regarding the aspects of query suggestions systems, as well as their structure, function and operation, can be found in commonly owned U.S. patent application Ser. No. 10/625,082, filed on Jul. 22, 2003, entitled, "TERM-BASED CONCEPT MARKET"; U.S. patent application Ser. No. 11/295,166, filed on Dec. 5, 2005, entitled "SYSTEMS AND METHODS FOR MANAGING AND USING MULTIPLE CONCEPT NETWORKS FOR ASSISTED SEARCH PROCESSING"; U.S. patent application Ser. No. 10/797,586, filed on Mar. 9, 2004, entitled "VECTOR ANALYSIS OF HISTOGRAMS FOR UNITS OF A CONCEPT NETWORK IN SEARCH QUERY PROCESSING"; U.S. patent application Ser. No. 10/797,614, filed on Mar. 9, 2004, entitled "SYSTEMS AND METHODS FOR SEARCH PROCESSING USING SUPERUNITS"; U.S. Pat. No. 7,051,023, filed on Nov. 12, 2003, entitled "SYSTEMS AND METHODS FOR GENERATING CONCEPT UNITS FROM SEARCH QUERIES," and U.S. Pat. No. 6,876,997, filed on May 22, 2000, entitled "METHOD AND APPARATUS FOR IDENTIFYING RELATED SEARCHES IN A DATABASE SEARCH SYSTEM, all of which are hereby incorporated herein by reference in their entirety. The systems and methods herein associated with query suggestion systems analysis may be practiced in combination with methods and systems described in the above-identified patent applications incorporated by reference.

An advertisement may represent the data the revenue generator A 110A wishes to be displayed to a user A 120A when the user A 120A searches for one of the listing's keywords. An advertisement may include a combination of the description and the title. The ad groups may each contain several different advertisements, which may be referred to as creatives. Each of the individual advertisements in an ad group may be associated with the same keywords. The advertisements may differ slightly in creative aspects or may be targeted to different demographics of the users 120A-N.

There may be some instances where multiple revenue generators 110A-N may have bid on the same search keyword. The service provider 130 may serve to the users 120A-N the online advertisements that the users 120A-N may be most likely to click on. For example, the service provider 130 may include a relevancy assessment to determine the relevancy of the multiple online advertisements to the search keyword. The more relevant an advertisement may be to the keyword the more likely it may be that the user A 120A may click on the advertisement. The relevancy may be determined by the service provider 130 or a third party relevancy engine.

Figure 13:
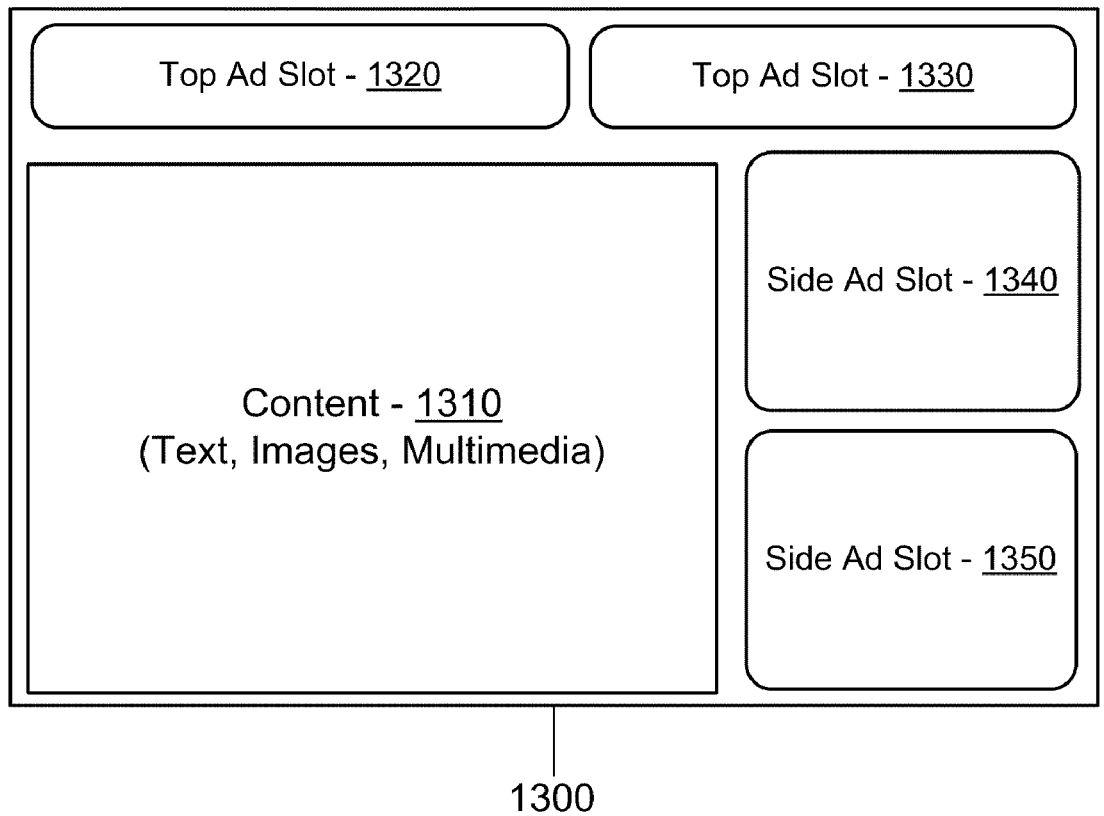
FIG. 13 is an illustration of an exemplary page displaying advertisements.
Figure 14:
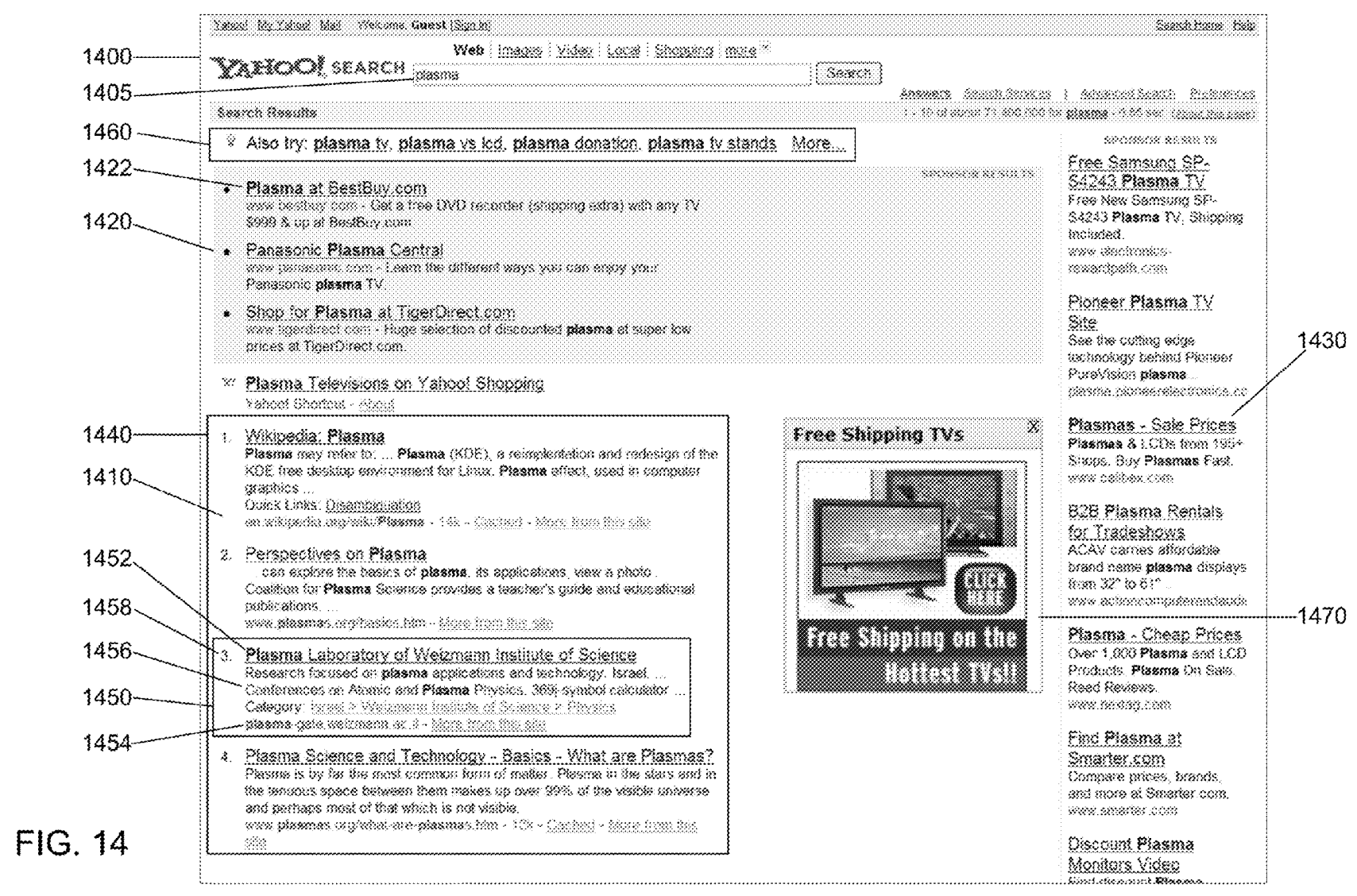

When one of the users 120A-N, such as the user A 120A, interacts with the service provider 130, such as by searching for a keyword, the service provider 130 may retain data describing the interaction with the user A 120A. The stored data may include the keyword searched for, the geographic location of the user A 120A, and the date/time the user A 120A interacted with the service provider 130. Further the data may include data describing the number of prominent ads, or top ads displayed on the page to the user A 120A. FIGS. 13 and 14 may show examples of top ads. The number of top ads on a given page may be referred to as the "DUDE" state of the page. The service provider 130 may retain the DUDE state of a page or query when a user A 120A clicks on an advertisement. The stored data may also generally include any data available to the service provider 130 that may assist in describing the interaction with the user A 120A, or describing the user A 120A.

The service provider 130 may also store data that indicates whether an advertisement of one of the revenue generators 110A-N, such as the revenue generator A 110A was displayed to the user A 120A, and whether the user A 120A clicked on the advertisement, or generally any other data that may assist the revenue generators 110A-N in determining the effectiveness of their advertisements. The data may also include data describing the rank of the advertisement clicked on by the user A 120A. The rank may refer to the order in which the advertisements are displayed on the page. For example, the first displayed advertisement may have a rank of "1," the second displayed advertisement may have a rank of "2," and so on.

In some instances the advertisement may have been displayed to the user A 120A as a result of a query suggestion from a query suggestion system, or matching system, implemented by the service provider 130. The query suggestion system may have suggested a query matching the query of the user A 120A. The suggested query may have had advertisements relevant to the query of the user A 120A and the relevant advertisement may have been displayed to the user A 120A. In theses instances, the service provider 130 may store the query that the service provider 130 matched to the query of the user A 120A along with a unique identifier describing the matching system that suggested the query, such as the name of the matching system.

The users 120A-N may supply information relating to their geographic location and/or other descriptive information upon their initial interaction with the service provider 130. Alternatively or in addition the service provider 130 may obtain the location of the user A 120A based on the IP address of the user A 120A. The service provider 130 may use a current date/time stamp to store the date/time when the user A 120A interacted with the service provider 130.

The service provider 130 may generate reports based on the data collected from the user interactions and communicate the reports to the revenue generators 110A-N to assist the revenue generators 110A-N in measuring the effectiveness of their online advertising. The reports may indicate the number of times the users 120A-N searched for the keywords bid on by the revenue generators 110A-N, the number of times each advertisement of the ad groups of the revenue generators 110A-N was displayed to the users 120A-N, the number of times the users 120A-N clicked through on each advertisement of the ad groups of the revenue generators 110A-N, and/or the number of times a desired action was performed by the users 120A-N after clicking through on an advertisement. The reports may also generally indicate any data that may assist the revenue generators 110A-N in measuring or managing the effectiveness of their online advertising.

The reports may further include sub-reports that segment the data into more specific categories, including the time intervals when the interactions occurred, such as weeknights primetime, weekends, etc., the demographics of the users 120A-N, such as men ages 18-34, the location of the users 120A-N. The reports may also generally include any other data categorization that may assist the revenue generators 110A-N in determining the effectiveness of their online advertising.

More detail regarding the aspects of auction-based systems, as well as the structure, function and operation of the service provider 130, as mentioned above, can be found in commonly owned U.S. patent application Ser. No. 10/625,082, filed on Jul. 22, 2003, entitled, "TERM-BASED CONCEPT MARKET"; U.S. patent application Ser. No. 10/625,000, file on Jul. 22, 2003, entitled, "CONCEPT VALUATION IN A TERM-BASED CONCEPT MARKET" filed on Jul. 22, 2003; U.S. patent application Ser. No. 10/625,001, filed on Jul. 22, 2003, entitled, "TERM-BASED CONCEPT INSTRUMENTS"; and U.S. patent application Ser. No.

11/489,386, filed on Jul. 18, 2006, entitled, "ARCHITECTURE FOR AN ADVERTISEMENT DELIVERY SYSTEM," all of which are hereby incorporated herein by reference in their entirety. The systems and methods herein associated with ad campaign management may be practiced in combination with methods and systems described in the above-identified patent applications incorporated by reference.

Figure 2:
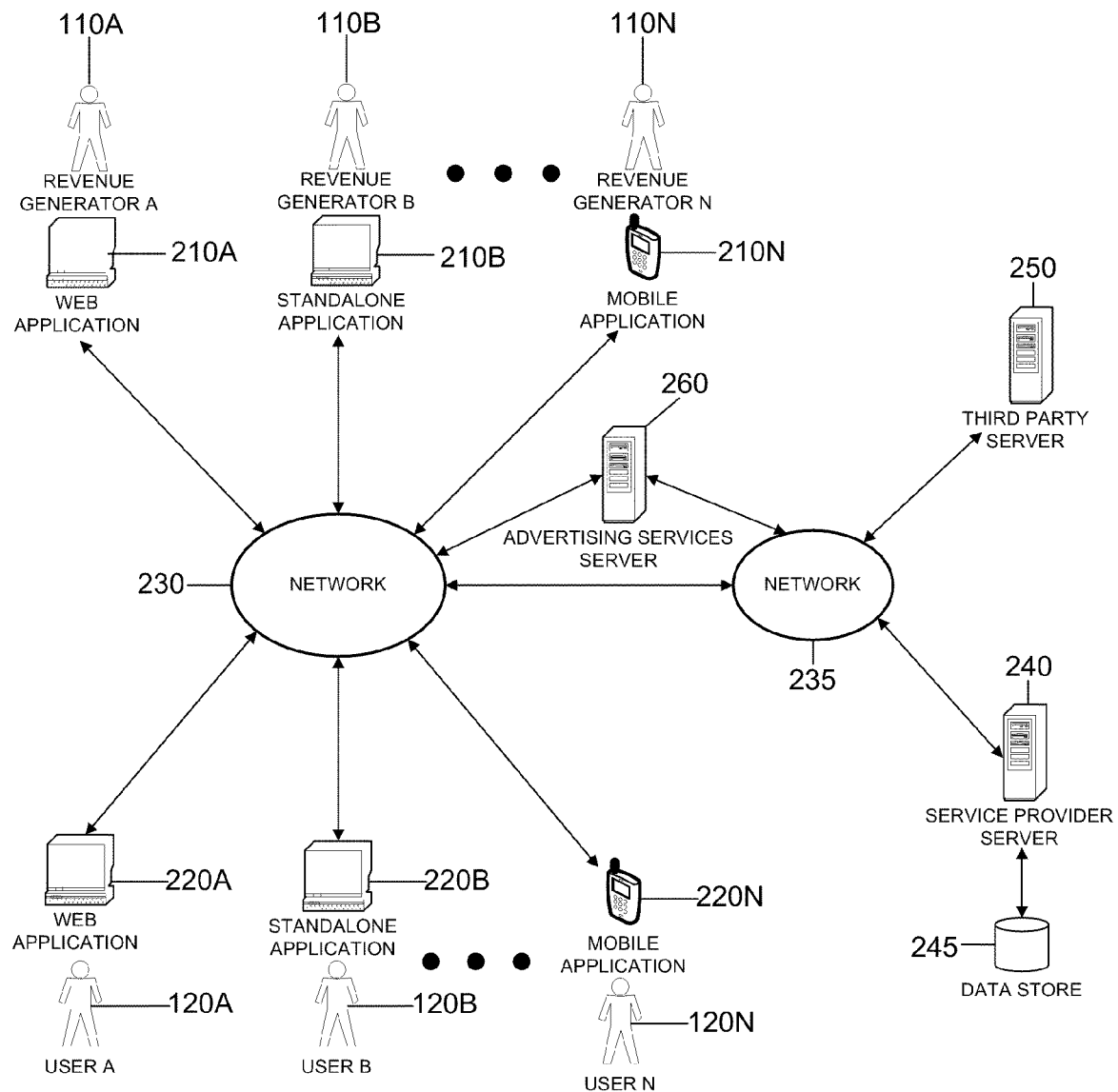
FIG. 2 is block diagram of a simplified view of a network environment implementing the system of FIG. 1 or other systems for generating query suggestions using a network of users and advertisers.

FIG. 2 provides a simplified view of a network environment 200 implementing the system of FIG. 1 or other systems for generating query suggestions using a network of users and advertisers. Not all of the depicted components may be required, however, and some implementations may include additional components not shown in the figure. Variations in the arrangement and type of the components may be made without departing from the spirit or scope of the claims as set forth herein. Additional, different or fewer components may be provided.

The network environment 200 may include one or more web applications, standalone applications and mobile applications 210A-N, which may be collectively or individually referred to as client applications for the revenue generators 110A-N. The system 200 may also include one or more web applications, standalone applications, mobile applications 220A-N, which may collectively be referred to as client applications for the users 120A-N, or individually as a user client application. The system 200 may also include a network 230, a network 235, the service provider server 240, a data store 245, a third party server 250, and an advertising services server 260.

Some or all of the advertisement services server 260, service provider server 240, and third-party server 250 may be in communication with each other by way of network 235. The advertisement services server 260, third-party server 250 and service provider server 240 may each represent multiple linked computing devices. Multiple distinct third party servers, such as the third-party server 250, may be included in the network environment 200. A portion or all of the advertisement services server 260 and/or the third-party server 250 may be a part of the service provider server 240.

The data store 245 may be operative to store data, such as data relating to interactions with the users 120A-N. The data store 245 may include one or more relational databases or other data stores that may be managed using various known database management techniques, such as, for example, SQL and object-based techniques. Alternatively or in addition the data store 245 may be implemented using one or more of the magnetic, optical, solid state or tape drives. The data store 245 may be in communication with the service provider server 240. Alternatively or in addition the data store 245 may be in communication with the service provider server 240 through the network 235.

The networks 230, 235 may include wide area networks (WAN), such as the internet, local area networks (LAN), campus area networks, metropolitan area networks, or any other networks that may allow for data communication. The network 230 may include the Internet and may include all or part of network 235; network 235 may include all or part of network 230. The networks 230, 235 may be divided into sub-networks. The sub-networks may allow access to all of the other components connected to the networks 230, 235 in the system 200, or the sub-networks may restrict access between the components connected to the networks 230, 235. The network 235 may be regarded as a public or private network connection and may include, for example, a virtual private network or an encryption or other security mechanism employed over the public Internet, or the like.

The revenue generators 110A-N may use a web application 210A, standalone application 210B, or a mobile application 210N, or any combination thereof, to communicate to the service provider server 240, such as via the networks 230, 235. Similarly, the users 120A-N may use a web application 220A, a standalone application 220B, or a mobile application 220N to communicate to the service provider server 240, via the networks 230, 235.

The service provider server 240 may communicate to the revenue generators 110A-N via the networks 230, 235, through the web applications, standalone applications or mobile applications 210A-N. The service provider server 240 may also communicate to the users 120A-N via the networks 230, 235, through the web applications, standalone applications or mobile applications 220A-N.

The web applications, standalone applications and mobile applications 210A-N, 220A-N may be connected to the network 230 in any configuration that supports data transfer. This may include a data connection to the network 230 that may be wired or wireless. Any of the web applications, standalone applications and mobile applications 210A-N, 220A-N may individually be referred to as a client application. The web applications 210A, 220A may run on any platform that supports web content, such as a web browser or a computer, a mobile phone, personal digital assistant (PDA), pager, network-enabled television, digital video recorder, such as TIVO®, automobile and/or any appliance capable of data communications.

The standalone applications 210B, 220B may run on a machine that may have a processor, memory, a display, a user interface and a communication interface. The processor may be operatively connected to the memory, display and the interfaces and may perform tasks at the request of the standalone applications 210B, 220B or the underlying operating system. The memory may be capable of storing data. The display may be operatively connected to the memory and the processor and may be capable of displaying information to the revenue generator B 110B or the user B 120B. The user interface may be operatively connected to the memory, the processor, and the display and may be capable of interacting with a user B 120B or a revenue generator B 110B. The communication interface may be operatively connected to the memory, and the processor, and may be capable of communicating through the networks 230, 235 with the service provider server 240, third party server 250 and advertising services server 260. The standalone applications 210B, 220B may be programmed in any programming language that supports communication protocols. These languages may include: SUN JAVA®, C++, C#, ASP, SUN JAVASCRIPT®, asynchronous SUN JAVASCRIPT®, or ADOBE FLASH ACTIONSCRIPT®, amongst others.

The mobile applications 210N, 220N may run on any mobile device that may have a data connection. The data connection may be a cellular connection, a wireless data connection, an internet connection, an infra-red connection, a Bluetooth connection, or any other connection capable of transmitting data.

The service provider server 240 may include one or more of the following: an application server, a data store, such as the data store 245, a database server, a middleware server, and an advertising services server. The service provider server 240 may co-exist on one machine or may be running in a distributed configuration on one or more machines. The service provider server 240 may collectively be referred to as the server. The service provider may implement a search engine marketing system and/or an advertising campaign management system. The service provider server 240 may receive requests from the users 120A-N and the revenue generators 110A-N and may serve pages to the users 120A-N and the revenue generators 110A-N based on their requests.

The third party server 250 may include one or more of the following: an application server, a data source, such as a database server, a middleware server, and an advertising services server. The third party server may implement a relevancy engine, a context matching engine, or any other third party application that may be used in a search engine marketing system and/or an advertising campaign management system. The third party server 250 may co-exist on one machine or may be running in a distributed configuration on one or more machines. The third party server 250 may receive requests from the users 120A-N and the revenue generators 110A-N and may serve pages to the users 120A-N and the revenue generators 110A-N based on their requests.

Figure 15:
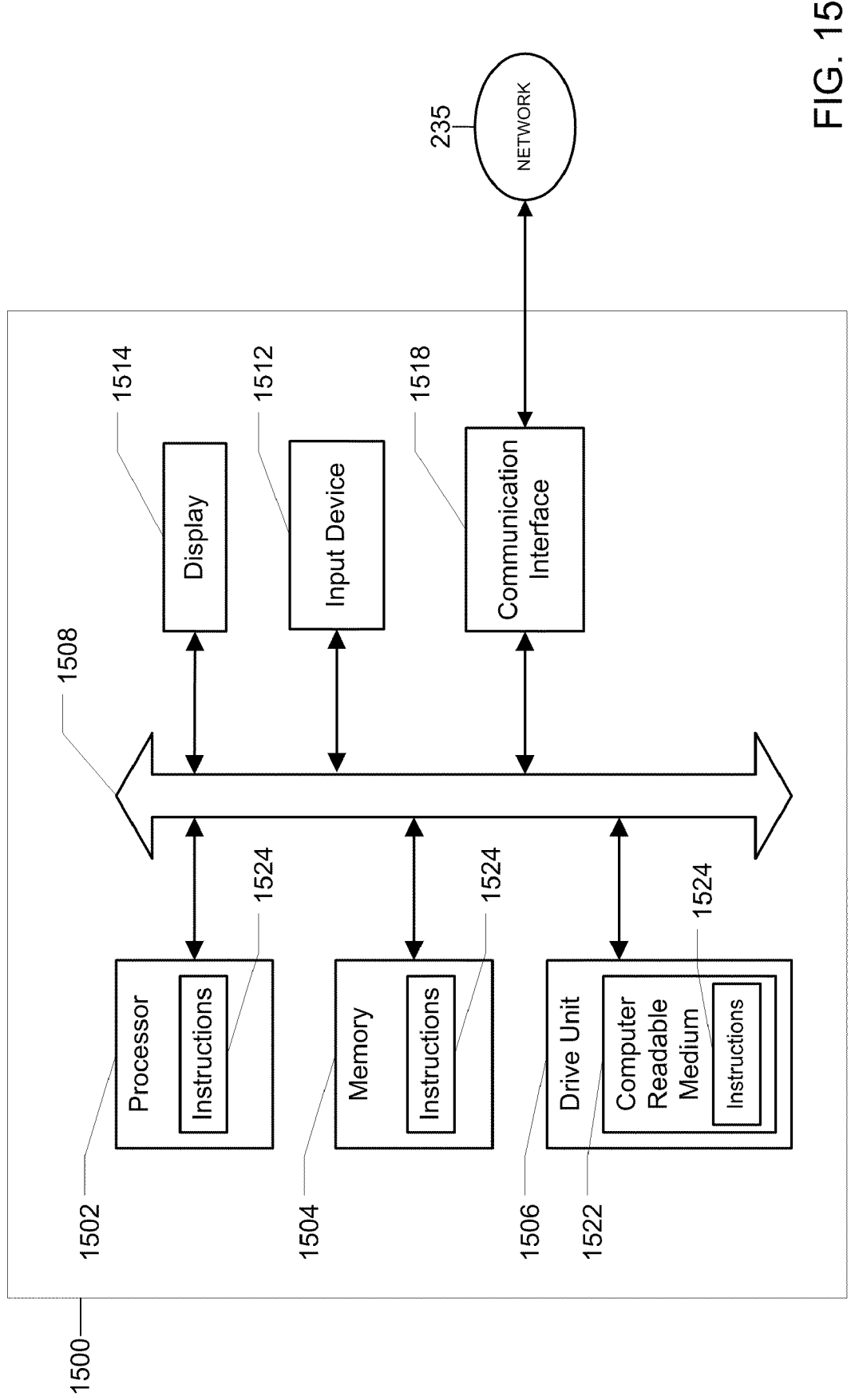
FIG. 15 is an illustration a general computer system that may be used in the system of FIG. 3 or other systems for generating query suggestions using a network of users and advertisers.

The service provider server 240, the third party server 250 and the advertising services server 260 may be one or more computing devices of various kinds, such as the computing device in FIG. 15. Such computing devices may generally include any device that may be configured to perform computation and that may be capable of sending and receiving data communications by way of one or more wired and/or wireless communication interfaces. Such devices may be configured to communicate in accordance with any of a variety of network protocols, including but not limited to protocols within the Transmission Control Protocol/Internet Protocol (TCP/IP) protocol suite. For example, the web applications 210A, 210A may employ HTTP to request information, such as a web page, from a web server, which may be a process executing on the service provider server 240 or the third-party server 250.

There may be several configurations of database servers, such as the data store 245, application servers, middleware servers and advertising services servers included in the service provider server 240, or the third party server 250. Database servers may include MICROSOFT SQL SERVER®, ORACLE®, IBM DB2® or any other database software, relational or otherwise. The application server may be APACHE TOMCAT®, MICROSOFT IIS®, ADOBE COLDFUSION®, YAPACHE® or any other application server that supports communication protocols. The middleware server may be any middleware that connects software components or applications. The middleware server may be a relevancy engine, a context matching engine, or any other middleware that may be used in a search engine marketing system and/or an advertising campaign management system.

The application server on the service provider server 240 or the third party server 250 may serve pages, such as web pages to the users 120A-N and the revenue generators 110A-N. The advertising services server 260 may provide a platform for the inclusion of advertisements in pages, such as web pages. The advertising services server 260 may also exist independent of the service provider server 240 and the third party server 250. The advertisement services server 260 may be used for providing advertisements that may be displayed to users 120A-N on pages, such as web pages. The advertising services server 260 may implement a search engine marketing system and/or an advertising campaign management system.

The networks 230, 235 may be configured to couple one computing device to another computing device to enable communication of data between the devices. The networks 230, 235 may generally be enabled to employ any form of machine-readable media for communicating information from one device to another. Each of networks 230, 235 may include one or more of a wireless network, a wired network, a local area network (LAN), a wide area network (WAN), a direct connection such as through a Universal Serial Bus (USB) port, and the like, and may include the set of interconnected networks that make up the Internet. The networks 230, 235 may include any communication method by which information may travel between computing devices.

Figure 3:
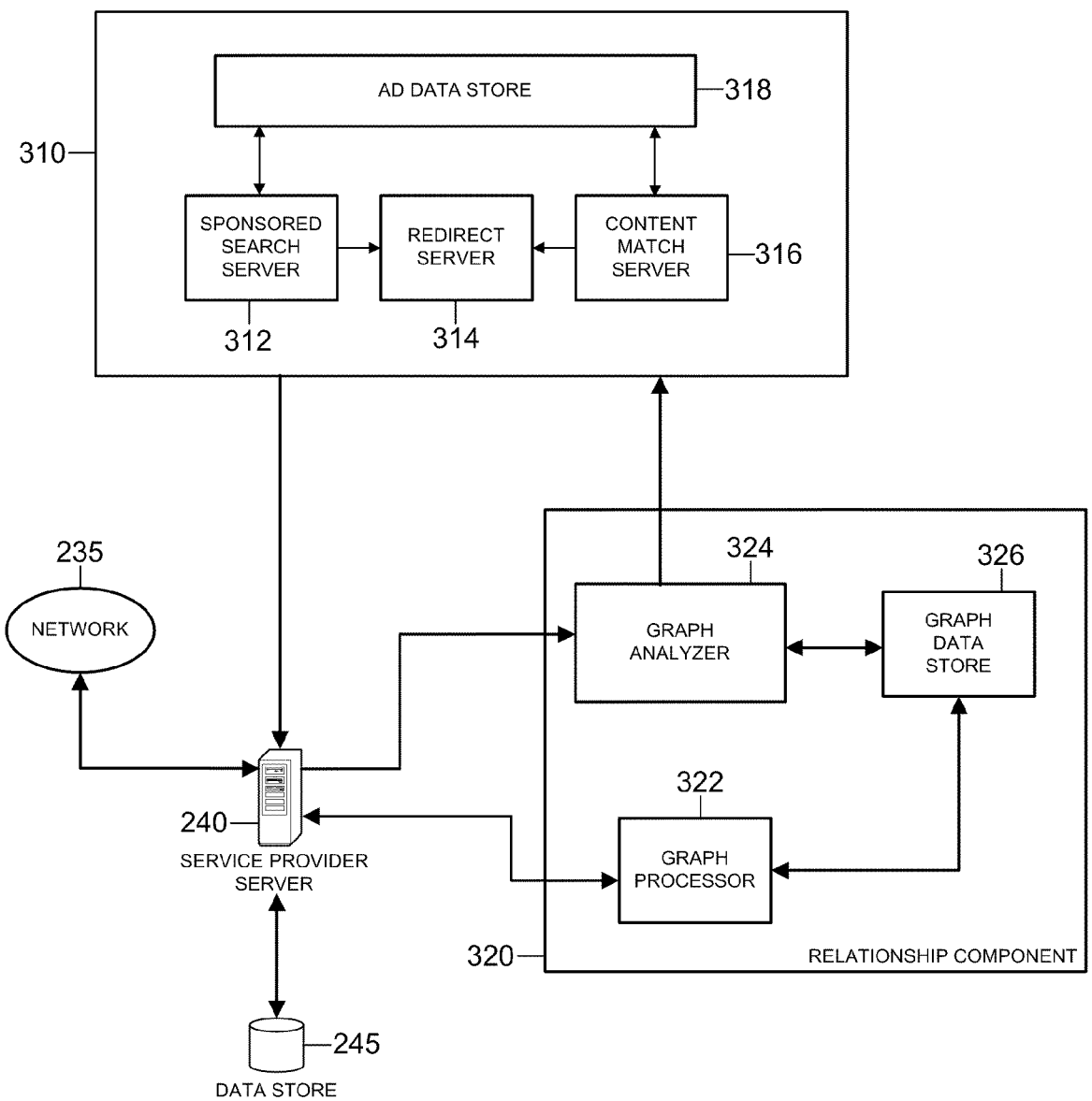
FIG. 3 is a block diagram illustrating a system for generating query suggestions using a network of users and advertisers.

FIG. 3 illustrates a system 300 for generating query suggestions using a network of users and advertisers. The system 300 may include an ad serving system 310, a graph component 320, a service provider server 240, a data store 245, and a network 235. The ad serving system 310 may be implemented by the service provider server 240, the ad services server 260, or the third party server 250. The ad serving system 310 may be an auction-based ad serving system. The ad serving system 310 may include an ad data store 318, a sponsored search server 312, a content match server 316, and a redirect server 314. The graph component 320 may be implemented by the service provider server 240, the ad services server 260, or the third party server 250. The graph component 320 may include a graph processor 322, a graph analyzer 324, and a graph data store 326. The graph component 320 may exist on one machine or may be running in a distributed configuration on one or more machines. The one or more machines of the graph component 320 may be one or more computing devices of various kinds, such as the computing device in FIG. 15. Not all of the depicted components may be required, however, and some implementations may include additional components not shown in the figure. Variations in the arrangement and type of the components may be made without departing from the spirit or scope of the claims as set forth herein. Additional, different or fewer components may be provided.

The ad data store 318 may be operative to store data, such as advertisement listings. The ad data store 318 may include one or more relational databases or other data stores that may be managed using various known database management techniques, such as, for example, SQL and object-based techniques. Alternatively or in addition the ad data store 318 may be implemented using one or more of the magnetic, optical, solid state or tape drives.

The sponsored search server 312 may be operative to process sponsored search listing requests from the client applications 210A-N, received via the service provider server 240 or the graph component 320. When a request for a sponsored search listing comes from service provider server 240 or the graph component 320, the sponsored search server 312 may query the ad data store 318 for any advertisements, matching the search terms specified in the request. If matching ad listings are available in the ad data store 318, the sponsored search server 312 may return the retrieved data to the service provider server 240. The service provider server 240 may then serve the ad listings, such as sponsored listings, to the client applications 210A-N. The advertisements may be displayed in descending order based on the bid value for the given search terms whereby matching ads with the highest bids are displayed first followed by the lower bid advertisements. Alternatively or in addition the advertisements may be displayed in the order based on the relevancy of the advertisements to the search terms. The relevancy may be determined by a relevancy engine implemented on the service provider server 240 or the third party server 250.

The content match server 316 may operate in a similar manner. The content match server 316 may be operative to process content match listing requests from the service provider server 240 or the graph component 320. When a request for a content match listing comes from the service provider server 240 or the graph component 320, the content match server 316 may query the ad data store 318 for any advertisements matching the search terms specified in the request. If matching ad listings are available in the ad data store 318, the content match server 316 may return the data the service provider server 240. The service provider server 240 may then serve the advertisements to the client applications 210A-N. The advertisements may be displayed in descending order based on the bid value for the given search terms whereby matching ads with the highest bids are displayed first followed by the lower bid advertisements. Alternatively or in addition the advertisements may be displayed in the order based on the relevancy of the advertisements to the search terms. The relevancy may be determined by a relevancy engine implemented on the service provider server 240 or the third party server 250.

The graph component 320 may be operative to build, store, and analyze data representing a graph through the graph processor 322, the graph analyzer 324, and the graph data store 326. The graph may be a data representation of a network of users and advertisers through relationships between advertisements and queries. A query may refer to the set of terms searched for by one of the users 120A-N, or a set of terms that may be related to the content on a page displayed to one of the users 120A-N.

The graph data store 326 may be operative to store data, such as data describing a network of users and advertisers, or advertisements and queries. The graph data store 326 may include one or more relational databases or other data stores that may be managed using various known database management techniques, such as, for example, SQL and object-based techniques. Alternatively or in addition the graph data store 326 may be implemented using one or more of the magnetic, optical, solid state or tape drives.

The graph processor 322 may be operative to process historical data, such as historical click data to generate data describing a network of users and advertisers, as illustrated below in FIG. 4. The network of users and advertisers may be represented by data describing relationships between advertisements and queries.

The graph processor 322 may store the graph data in the graph data store 326. The graph processor 322 may retrieve the historical data from the data store 245 to generate the graph data. The graph processor 322 may be in communication with the data store 245, or may access the data store 245 via the service provider server 240.

The graph processor 322 may build the graph by processing the historical data. The historical data may be processed to build link data describing the relationships between the queries, such as search queries of the users 120A-N and/or queries, or a set of terms, related to the content on a page displayed to the user 120A-N, and the advertisements displayed as a result of the queries. The links may be weighted by a metric describing the effectiveness of the advertisement, such as data related to user click throughs, conversions, or any other metric measuring the effectiveness of the online advertisements. The graph may be independent of the language and other regional characteristics of the underlying data. The graph processor 322 may be capable of generating the graph by using any of the aforementioned metrics measuring the effectiveness of online advertisements.

Alternatively or in addition the graph processor 322 may only generate a link between a query and an advertisement if one of the users 120A-N clicked through on the advertisement. Therefore if an advertisement was displayed to the users 120A-N for a particular query and none of the users 120A-N clicked on the advertisement during the period of time represented by the historical data then the graph processor 322 may not generate a link for the advertisement/query pair.

The graph processor 322 may re-process the historical data to build a new graph at set intervals, such as daily, weekly, monthly, or any other period that may increase the accuracy of the graph's representation of the network. The graph data store 326 may store every build of the graph, identifying each individual build by the date/time the build occurred.

The graph analyzer 324 may be operative to analyze the stored graph data to perform a specified task, such as supplying suggested search terms related to the terms searched for by one of the users 120A-N, supplying advertisements related to the terms search for, or any other task that may be accomplished by analyzing the graph data. The graph analyzer 324 may analyze the graph in real time, such as when a search term is received from the service provider.

Alternatively or in addition, the graph analyzer 324 may pre-process the graph data to generate a separate data structure. The data structure may be hashmap linking each query to relevant queries and advertisements. Large scale implementations of the network may require offline pre-processing of the graph data.

The graph analyzer 324 may be operative to analyze the graph to increase the depth and competitiveness of keywords using the graph. The graph analyzer 324 may be operative to analyze the graph to generate keyword suggestions which may be queried at advertisement serving time, presented to advertisers during campaign management and/or added to augment advertisements to be served by the service provider server 240.

The graph analyzer 324 may be operative to analyze the graph to evaluate the quality (relevance, value) of keyword suggestions and other matching techniques in the first and higher orders. The graph analyzer 324 may be operative to analyze the graph to determine high performing suggestions and to explore unknown or low value suggestions scheduled by some measure based on relevance. The graph analyzer 324 may be operative to analyze the graph to estimate the relative quality of advertisements.

The graph analyzer 324 may be operative to analyze the graph to capture the semantic knowledge gap between raw user queries (often syntactically different) and underlying user intent behind the queries. The graph analyzer 324 may use the semantic knowledge gap to generate keyword suggestions. For example, each query may describe an intent and/or need of a user A 120A in the form of a set of keywords. The user intent and/or need may not be accurately represented by the queries since the queries may only partially capture the semantic intent of the user A 120A.

The graph analyzer 324 may associate the queries of the user A 120A with relevant queries of the other users 120B-N per the calculations below. The graph analyzer 324 may organize the queries into groups. The membership of a query q in a group may be determined by the number of relevant queries that the query q shares with other queries that may be a member of the group. Membership to a group may be partial. For example the query q may belong to group X at 70% and to group Y at 30%. Membership to a group may be determined by any data clustering algorithm, such as k-means clustering, QT clustering, or Fuzzy c-means clustering.

Once the allocation of queries to each group has been completed the salient queries in each group may be used to describe the semantic intent of the user A 120A. The salient query of each group may also be determined by utilizing data clustering algorithms, such as k-means clustering, QT clustering, or Fuzzy c-means clustering. For example, a user query such as "mp3 player" may have relevant queries of "ipod"® and "noise-canceling headphones." The query "ipod"®may belong to the query group described by "portable music players" while the query "noise-canceling headphones may belong to the query group described by "music players accessories."

The graph analyzer 324 may then determine the relationship value between the user query and the salient queries of each group. The groups that are found to be closely related to the user query may capture the semantic intent of the user A 120. The user query may then be matched with queries and advertisements associated with these groups.

Alternatively or in addition to the groups may be organized by both queries and advertisements that the users 120A-N clicked on. The salient representative may be either queries or advertisements.

The graph analyzer 324 may be operative to analyze each successive build of the graph to determine advertiser and/or user changes, such as changes in advertiser participation, advertiser intent, advertiser valuation and spend, user behavior, demographics and mix, aggregate user intent and mix, and search usage. The graph analyzer 324 may be operative to combine various builds of the graph across markets defined by language and other regional characteristics.

The graph analyzer 324 may be operative to analyze successive builds of the graph to capture temporal shifts in user intent, advertiser intent and/or context. The graph analyzer 324 may use the captured temporal shift to identify a corresponding shift in the semantic knowledge in the form of keyword suggestions. The keyword suggestions may implicitly capture language seasonal patterns, and progress of human knowledge representation in the form of language.

The graph analyzer 324 may be operative to identify both significantly related and unrelated sub-networks within the network represented by the graph. The sub-networks may be identified based on keyword semantic affinities, advertiser online spend, and/or historical performance based on user interactions and revenue generated by the advertisements. In addition, the graph analyzer 324 may be operative to clustering groups of related nodes. For example, the relationship or proximity of queries and advertisements may be determined, as demonstrated below. The queries that are determined to be closely related may be grouped into a node. The advertisements related to those queries may also be grouped into a node. These nodes may provide a higher level perspective of the network. Alternatively or in addition advertisements of a common advertiser may be grouped together. This network may be used to determine information, such as demographics, about the users 120A-N interested in a certain advertiser, regardless of the specific advertisement.

Figure 4:
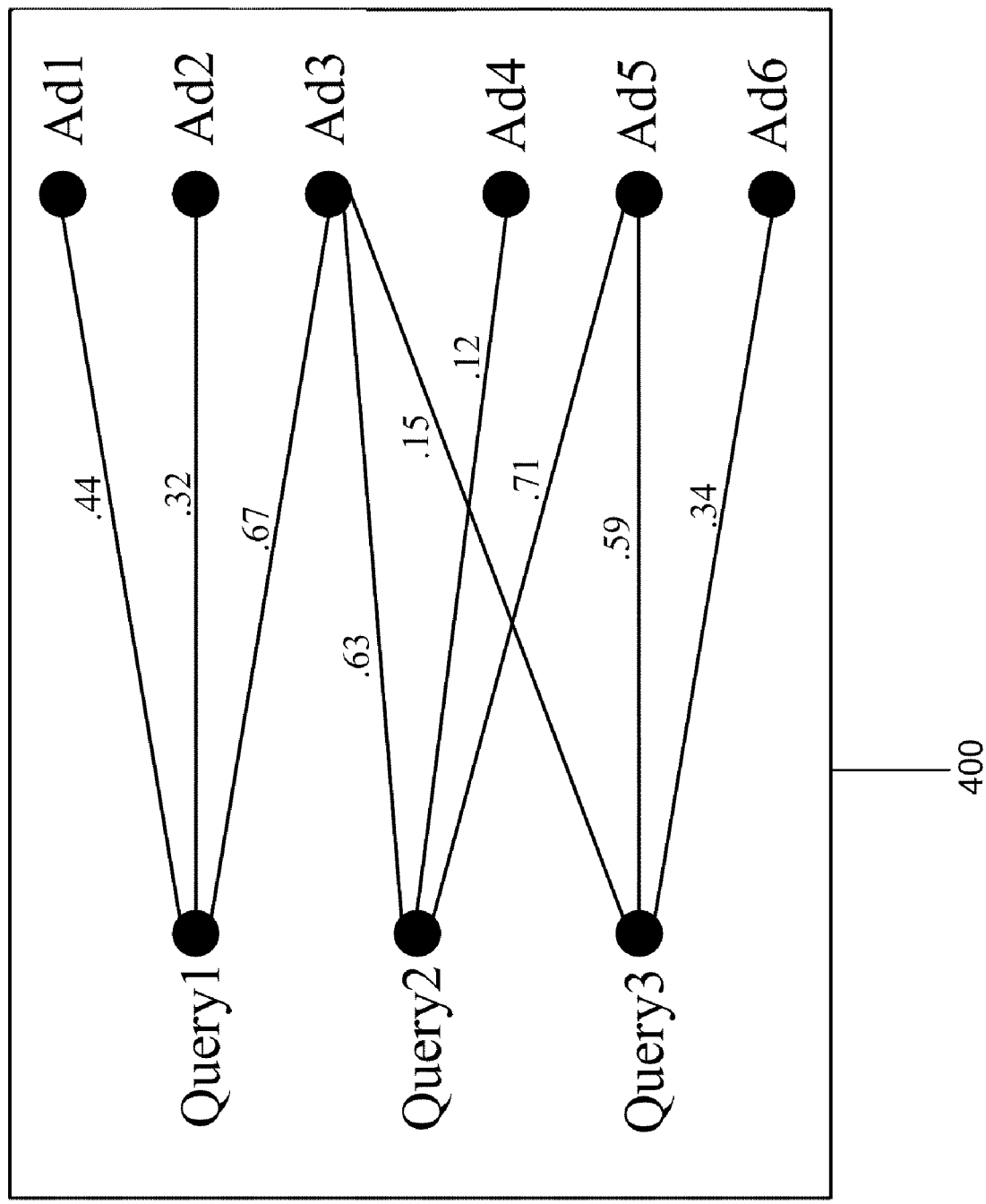
FIG. 4 is a graph illustrating an example of a network of users and advertisers used in the system of FIG. 3 or other systems for optimizing the performance of online advertisements using a network of users and advertisers.

FIG. 4 is a graph 400 illustrating an example of a network of users and advertisers used in by the system 300 of FIG. 3 or other systems for generating query suggestions using a network of users and advertisers. The graph 400 may be a bipartite graph. A bipartite graph may be a graph containing two types of nodes or points. In a bipartite graph no node may be linked to another node of the same type.

In the case of the graph 400, the node types may be query nodes and advertisements nodes. The query nodes may represent queries performed by the users 120A-N as represented in the historical data, queries related to content on a page displayed to the users 120A-N, and/or any other set of terms that may be matched to an advertisement. The query nodes may represent the interest of the users 120A-N as demonstrated through the search queries. The advertisement nodes may represent the advertisements that may have been displayed to, or clicked on, by the users 120A-N as a result of the queries. The advertisement nodes may represent the revenue generators 110A-N, such as advertisers, or more particularly the advertisement nodes may represent the intent of the advertisers. The advertisers' intent may be demonstrated through the queries the advertisements may be linked to and therefore the queries the advertisers' may have previously bid on.

A query node may be linked to an advertisement node if one of the users 120A-N, such as the user A 120A searches for the query and the advertisement is displayed to the user A 120A as a result of the query. Alternatively or in addition a query node may be linked to an advertisement node if an advertisement is displayed to the user A 120A as a result of a query related to the content of a page, such as a page displayed to the user A 120A. In the graph 400, the users 120A-N may have searched for Query1, Query2, and Query3. When the users 120A-N searched for Query1, Ad1, Ad2, and Ad3 may have been displayed. When the users 120A-N searched for Query2, Ad3, Ad4, and Ad5 may have been displayed. When the users 120A-N searched for Query3, Ad3, Ad5, and Ad6 may have been displayed.

Once a link between a query and an advertisement is established, the query may be weighted, or quantified, based on a metric relating to the relationship between the advertisement and the query. For example, the link may be weighted based on the click through rate of the advertisement for the particular query. The click through rate for the link may be only account for the click-throughs attributed to when the advertisement is displayed as a result of the query represented by the query node. The click through rate may be calculated over the period of time T represented by the historical data, such as the previous day, week, month, year, or any other time period. The weights can be seen in the graph 400 as values on the lines representing the links. The click through rate for a particular advertisement/query pair may be 0.0 if none of the users 120A-N clicked on the advertisement.

Figure 5:
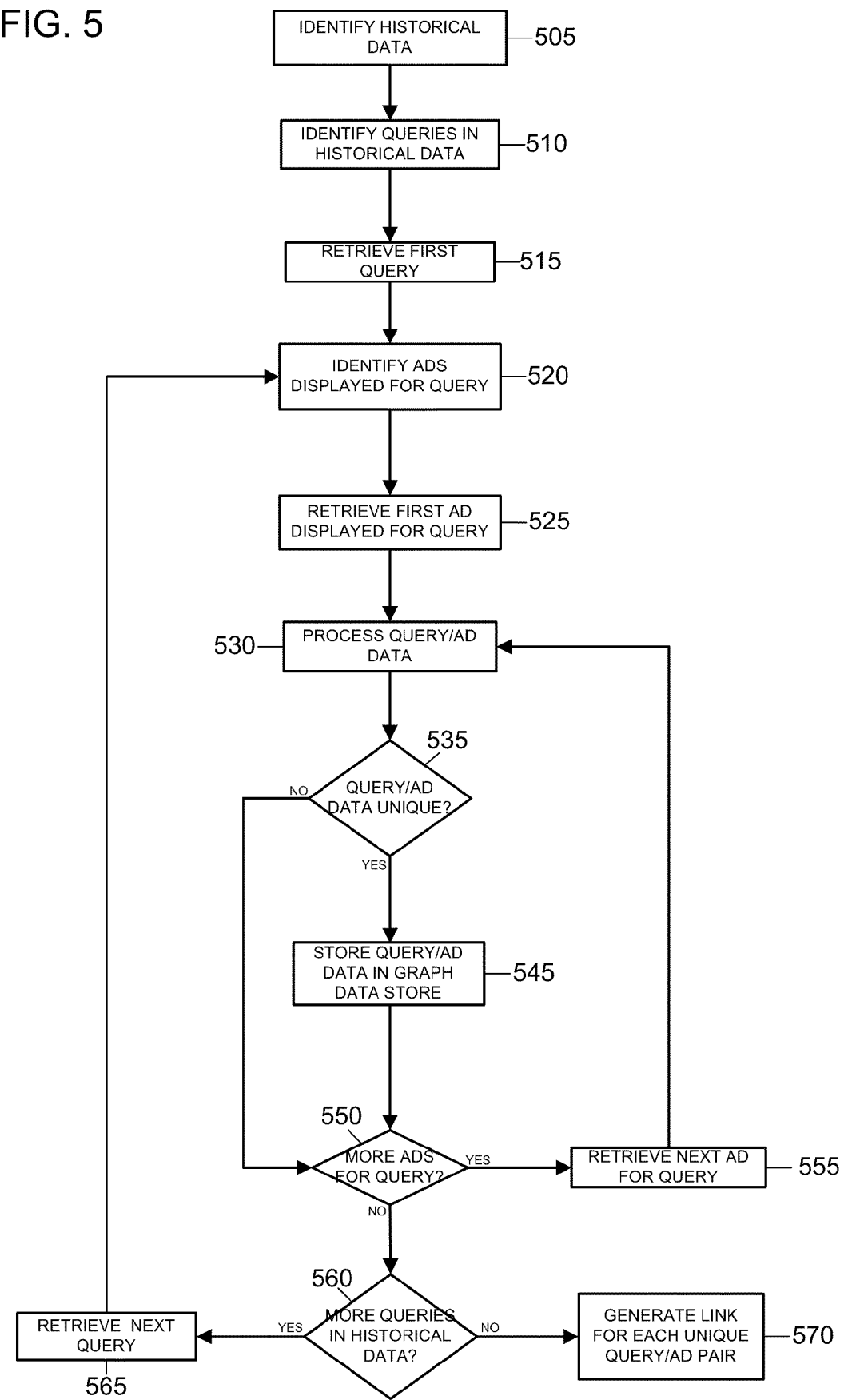
FIG. 5 is a flowchart illustrating the operations of the system of FIG. 3, or other systems for generating query suggestions using a network of users and advertisers.

FIG. 5 is a flowchart illustrating the operations of the system of FIG. 3, or other systems for generating query suggestions using a network of users and advertisers. At block 505 the graph processor 322 may identify historical data, such as historical user interaction data, historical user click data, historical ad display data, historical ad performance data, or generally any data relating to queries or the display of the resulting advertisements. The graph processor 322 may retrieve the historical data directly from the data store 245 or via the service provider 240. The historical data may represent all of the historical data for a given time period T, such as the previous day, month, year, or any other determinable time period. At block 510 the graph processor 322 may identify all of the individual queries in the historical data. The queries may represent a set of search terms or queries searched for by the users 120A-N during the time period T, such as through a search engine provided by the service provider 130. There may be more than one instance of a query if it was searched for more than once by the users 120A-N; however, the underlying data describing the particular user interaction may differ, and thus each query is processed individually. Alternatively or in addition the queries may represent a set of terms related to the content of a page, such as a page displayed to the users 120A-N during the time period T. The page may have been served to the users 120A-N by the service provider 130 and/or a service provider partner.

At block 515 the graph processor 322 may retrieve the first query, q, from the identified user queries. At block 520 the graph processor 322 may identify the advertisements displayed to the user A 120A when the user A 120A searched for q, or the advertisements displayed to the user A 120A as a result of content relating to q. At block 525 the graph processor 322 may retrieve the first advertisement, a, displayed for query q. At block 530 the graph processor 322 may process the data associated with this particular pairing of the query q and the advertisement a to generate raw context data. The operations of processing the data associated with the query/advertisement pair may be demonstrated in detail in FIG. 6.

At block 535 the graph processor 322 may determine if the raw context data of the query/advertisement pairing is unique. To determine if the raw context data is unique the graph processor 322 may compare the raw context data with existing raw context data in the graph data store 326. If the raw context data is unique the system 300 may move to block 545 to store the raw context data of the query/advertisement pair. If the raw context data is not unique the system 300 may move to block 550. The raw context data of query/advertisement pair may be described in FIG. 6.

At block 545 the graph processor 322 may store the raw context data representing the query/ad pair in the graph data store 326. At block 550 the graph processor 322 may determine whether there are more advertisements which were displayed as a result of the query q. If there are more advertisements, the system 300 may move to block 555. At block 555 the graph processor 322 may retrieve the next advertisement for the query q. The system 300 may then return to block 530 and repeat the operations for the advertisement. Once the system 300 has cycled through all of the advertisements for the query the system 300 may move to block 560. At block 560 the graph processor 322 may determine if there are remaining queries in the historical data. If there are no remaining queries then the system 300 may move to block 370. If there are more queries in the historical data then the system 300 may move to block 565. At block 565 the graph processor 322 may retrieve the next query. The system 300 may the return to block 520 and repeat the operations for the query.

At block 570 the system 300 may generate a link for each unique query/ad pair. The operations of generating the links for the query/ad pairs may be elaborated in FIG. 7. The query/ad links may be generated at a higher level of granularity than the raw context data of a query/ad pair. Thus there may be one query/ad link representing the raw context data of several query/ad pairs.

Figure 6:
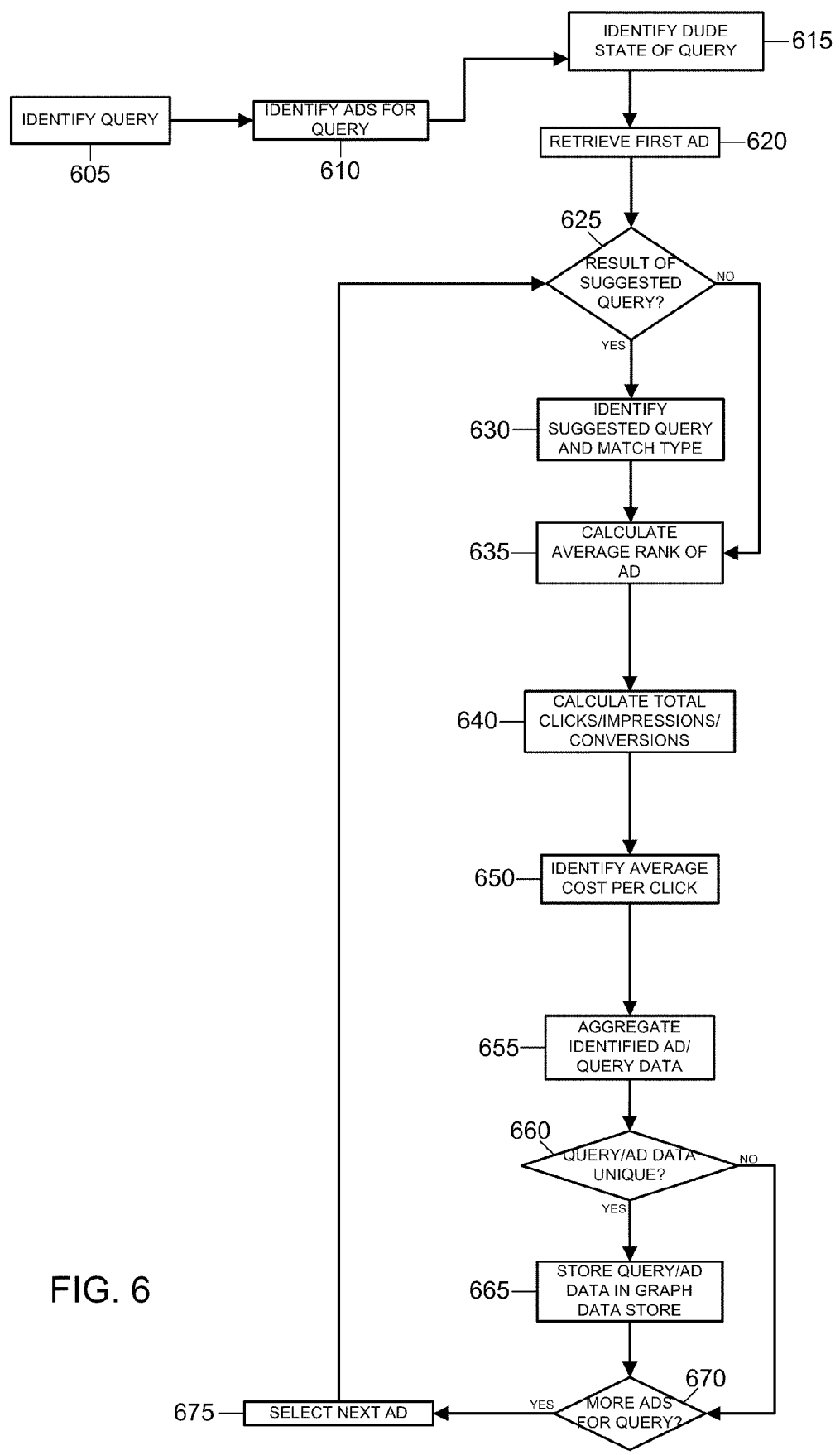
FIG. 6 is a flowchart illustrating the operations of identifying the raw context data for a query/advertisement pairing in the system of FIG. 3, or other systems for generating query suggestions using a network of users and advertisers.

FIG. 6 is a flowchart illustrating the operations of identifying the raw context data representing a query/advertisement pairing in the system of FIG. 3, or other systems for generating query suggestions using a network of users and advertisers. At block 605 the graph processor 322 may identify a query q, such as the first query selected from the historical dataset in block 515 of FIG. 5. At block 610 the graph processor 322 may identify the advertisements that may have been displayed to one of the users 120A-N, such as the user A 120A, after the user A 120A searched for the query q, or the advertisements displayed to one of the users 120A-N as a result of the content q may have been related to.

At block 615 the graph processor 322 may identify the DUDE state D of the query. The DUDE state may refer to the number of advertisements that may have been prominently displayed to the user A 120A, such as top advertisements. Top advertisements are shown in more detail in FIGS. 13 and 14 below. Since the DUDE state indicates the number of prominent advertisements displayed to the user A 120A, the higher the value of the DUDE state the more likely that the user A 120A may have clicked on one of the advertisements. Therefore the DUDE state may need to be accounted for in order to accurately determine the effectiveness of the advertisements of the revenue generators 110A-N. The value of the DUDE state for the query q may be obtained from the historical data.

At block 620 the graph processor 322 may retrieve the first advertisement a displayed for the query q. At block 625 the graph processor 322 may determine whether the advertisement a was displayed as a result of a query suggestion from a matching system. As previously mentioned, the service provider server 240 may implement one or more matching systems that may suggest queries that may relate to the query of the user A 120A. Advertisements may be retrieved from the ad data store 318 for the original query of the user A 120A and any queries suggested by the matching systems. The most relevant ads may be displayed to the user A 120A. Alternatively or in addition the ads with the highest bids, for the original query or any suggested queries, may be displayed to the user A 120A, or any combination of the bid and the relevance. Data indicating whether the advertisement a was displayed as a result of a query suggested by a matching system may be obtained from the historical data.

If the advertisement a was displayed as a result of a query suggestion of a matching system, the system 300 may move to block 630. At block 630 the graph processor 322 may identify the query q' that was suggested by the matching system. The graph processor 322 may also identify the matching system M that suggested the query q'. The suggested query q' and the matching system M may be obtained from the historical data. Storing the matching system identification M may allow the system 300 to attribute the value of a link to the matching system that generated the suggestion. If the advertisement a was not displayed as a result of a query suggestion of a matching system, the system 300 may move to block 635.

At block 635 the graph processor 322 may calculate the average rank r of the advertisement a when it was displayed as a result of any instance of the query q. The rank of an advertisement may be the order in which it was displayed on the page to the user A 120A. For example, if the advertisement was the first advertisement displayed it may have a rank of 1, the second ad a rank of 2, and so on. FIG. 14 below may elaborate on the rank of an advertisement. The graph processor 322 may calculate the sum of the each rank of the advertisement a when it was displayed as a result of any instances of the query q, regardless of whether a was displayed due to a matching system. The sum may then be divided by the number of times the advertisement a was displayed as a result of the query q to calculate the average rank r. The data for the average rank calculation may be obtained from the historical data.

At block 640 the graph processor 322 may calculate the total number of clicks C, the total number of impressions I and/or the total number of conversions V for the advertisement a when it was displayed on a results page with a DUDE state D as a result of the query q. The graph processor 322 may calculate the total number of impressions I by retrieving from the historical data the number of times the advertisement a was displayed to the users 120A-N as a result of the query q, on a page with a DUDE state of D, regardless of whether a was displayed because of a suggested query. The graph processor 322 may calculate the total number of clicks C by retrieving from the historical data the number of times one of the users 120A-N clicked on the advertisement a on a search results page with a DUDE state D after searching for the query q, regardless of whether a was displayed because of to a suggested query. The graph processor 322 may calculate the total number of conversions V by retrieving from the historical data the number of times one of the users 120A-N performed a desired action on a web site of one of the revenue generators 110A-N, such as making a purchase, after searching for the query q and clicking on the advertisement a on a search results page with a DUDE state D, regardless of whether a was displayed due to a suggested query.

At block 650 the graph processor 322 may identify the average cost per click ppc for the advertisement a when it was retrieved by query q during the time period T. The graph processor 322 may calculate the average cost per click by calculating the sum of the cost for each click on the advertisement a when it was retrieved by query q in the historical data and dividing the sum by the total number of clicks on the advertisement a when it was retrieved by query q.

At block 655 the graph processor may aggregate the identified raw context data relating to the advertisement a and query q pair. The raw context data may include C the total clicks on ad listing a for query q, I the total impressions of ad listing a for query q, V the total conversions attributed to a click on ad listing a for query q, M (if any) the match type that retrieved ad listing a for query q, q' (if any) the actual bidded term responsible for the display of the ad listing a, D the DUDE state at the time of serving, r the average rank of the ad a when retrieved by query q, and ppc the average cost the revenue generator responsible for advertisement a pays per click when a is retrieved by q. The total number of clicks C, impressions I, and conversions V for a q/a pair may be calculated by taking a summation of the individual values for each DUDE state D that may exist for the q/a pair.

At block 660 the graph processor 322 may determine whether the aggregated raw context data relating to the q/a pair is unique. The graph processor 322 may search the graph data store 326 for an instance of a query/ad pair with the same raw context data as the q/a pair. The q/a pair may be unique if no other query/ad pair exists in the graph data store 326 with the same query q, advertisement a, match type M, suggested query q', and DUDE state Dr. If no query/ad pair is found in the graph data store 326 matching the raw context data of the q/a pair then the q/a pair may be unique. If the q/a pair is unique the system 300 may move to block 665. At block 665 the graph processor 322 may store the raw context q/a data in the graph data store 322. If the q/a pair is not unique, the system 300 may move to block 670.

At block 670 the graph processor 322 may determine if there are additional advertisements which were displayed when the user A 120A searched for the query q. If additional advertisements exist, the system 300 may move to block 675. At block 675 the graph processor 322 may select the next advertisement. The system 300 may then return to block 625 and repeat the operations for the selected advertisement. The graph processor 322 may cycle through the operations for each of the advertisements displayed to the user A 120A after searching for the query q.

Figure 7:
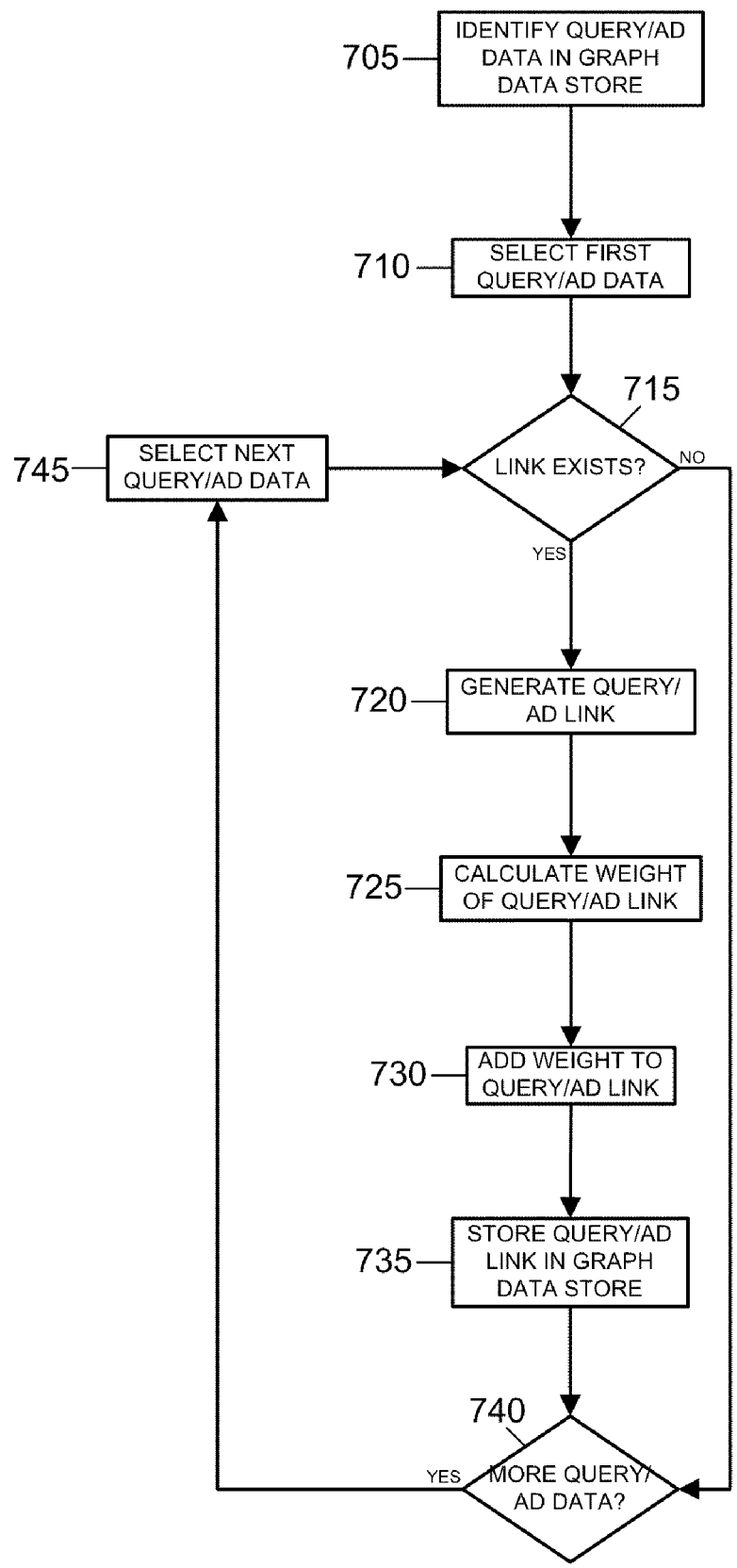
FIG. 7 is a flowchart illustrating the operations of building a link between a query and an advertisement in the system of FIG. 3 or other systems for generating query suggestions using a network of users and advertisers.

FIG. 7 is a flow chart illustrating the operations of building a link between each unique query and advertisement in the system of FIG. 3, or other systems for generating query suggestions using a network of users and advertisers. At block 705 the graph processor 322 may identify all of the query/ad raw context data stored in the graph data store 326. At block 710 the graph processor 322 may select the first raw context query/ad data, q/a.

At block 715 the graph processor 322 may determine whether a link exists in the graph data store 326 for q and a. A link between a q and a may be referred to as (q, a). The links may represent the framework for the query/advertisement graph and may be stored in a separate data structure from the query/ad pair data, such as a separate database table. There may only be one link for a given q and an a, while there may be several raw context data entries for a given q and a, such as raw context data with different match types, suggested queries, and/or DUDE states. Thus, the graph processor 322 may search the graph data store 326 to determine if a link from the query q to the ad listing a exists. If a link does not exist, the system 300 may move to block 720.

At block 720 the graph processor 322 may generate a link (q, a) between the query q and the advertisement a. The link may include an association between the query q and the advertisement a, such as a data entry linking the two. Visually the link may represent an edge in the bipartite graph.

At block 725 the graph processor 322 may calculate the weight of the (q, a) link. The weight may be thought of as the strength of the association between the query q and the advertisement a. The weight may also represent the relevance of the advertisement a to the query q. The weight may be represented as w(q, a). Since the DUDE state may have an impact on the effectiveness metrics the weights may often be calculated for each individual DUDE state D of a query q. The weight of (q, a) for a particular DUDE state D may be represented as w(q, a, D).

The weight, or relevance and/or utility measure, may be represented by several different metrics, such as clicked or not clicked, total clicks, un-normalized click through rate, position normalized click through rate, or generally any metric that may indicate the relevance or utility of q to a. Some examples of utility may include whether a conversion occurred or not, total conversions, un-normalized conversion rate, or position normalized conversion rate. A q may only have one relevance measure w(q,a) for any given a; in the position normalized case a q may have only one DUDE state during the time period T.

The value of clicked or not clicked weight may be 1 if a was clicked at least once as a result of q with a DUDE state of D over the period of time T, or 0 otherwise. The graph processor 322 may determine that a was clicked at least once if the total clicks, C, for (q, a) is greater than 0. The total clicks C may be determined from data stored in the graph data store 326. A weight of total clicks may be the total number of clicks for (q, a). The total clicks may be determined from data in the graph data store 326. A weight of total clicks for a given DUDE state may be determined by:

$$w(q,a,D) = \text{Clicks}(q,a,D).$$

A weight of an un-normalized click through rate may be the total clicks C for (q, a) divided by the total number of impressions I for (q, a). The total clicks and total impressions (q, a) may be determined from data in the graph data store 326. The weight as an un-normalized click through rate for a particular DUDE state D of (q, a) may be determined by:

$$w(q, a, D) = \frac{\text{Clicks}(q, a, D)}{I(q, a, D)}.$$

A weight of a position normalized click through rate of (q,a) for DUDE state D, also referred to as the Clicks over Expected Clicks (COEC) may be determined by:

$$w(q, a, D) = COEC(q, a, D) = \frac{\text{Clicks}(q, a, D)}{I(q, a, D) \cdot refCTR(D, r)}$$

where r may be the average rank associated with the (q, a). The refCTR may be a reference click through rate curve for the DUDE state D and average rank r of (q, a) averaged over all ads stored in the graph data store 326. Since the rank r stored in the graph data store 326 is an average rank, the average ranks may be rounded to the nearest integer. The average rank for the (q, a) may be retrieved from the graph data store 326. The refCTR may be calculated by:

$$refCTR(D, r) = \frac{\sum_{a \in A} C(D, r, a)}{\sum_{a \in A} I(D, r, a)}.$$

Alternatively or in addition, two weights may be calculated, a weight based on clicks, w1(q,a,D)=Clicks(q,a,D), and a weight based on conversions, w2(q,a,D)=Conversions(q,a, D). The two weights, w1 and w2, may be combined to determine the weight w. The weights may be combined by the following calculation:

$$w(q, a, D) = k * \frac{w1(q, a, D)}{I(q, a, D) \cdot refCTR(D, r)} + (1-k) * w2(q, a, D).$$

In this case k may be a system constant, such as 0.1, 1, 10, or any value.

Alternatively or in addition the weight may be scaled by a factor, referred to as the inverse advertiser frequency (IAF). An individual IAF may be determined for each advertisement. The IAF may indicate the overall importance of an advertisement a to a query q as compared to other advertisements. The IAF may be computed from the log data or be assigned through some other definition or heuristic process. An advertisement a that is associated with a very large number of queries may not provide a strong indication of an association between a and any one of the queries. In this instance the IAF may be a very small value. If an advertisement is associated with a very small number of queries, the advertisement may be specialized to address solely this narrow set of queries. In this instance the IAF may be a very large value. After the IAF is determined it may be used to adjust, or scale, the weight through the following calculation:

w(q,a,D)=w(q,a,D)*IAF.

Alternatively or in addition, the weight may be adjusted to account for the reliability of the weight. The reliability of a weight may depend upon the number of values, such as clicks, that contribute to the weight. For example, weights derived from only a few clicks may be unreliable. In order to account for the reliability of a weight the weight may be adjusted to incorporate a measure of reliability in its estimate. In the case of weights derived from clicks, a reliability factor rf may be determined. The rf may be equal to 1.0 if there are more than 100 clicks, indicating a reliable weight or value. If there are fewer than 100 clicks the rf may be a value between 0 and 1.0. As the number of clicks approaches 0, the rf may also approach 0. In one instance the rf may be linearly related to the number of clicks below 100. For example, if there are 50 clicks, then the rf may be 0.5, and if there are 25 clicks the rf may be 0.25. Once the rf is determined it may be applied to the weight between q and a by the following calculation:

w(q,a,D)=w(q,a,D)*rf.

Alternatively or in addition the reliability factor rf may also be determined from the conversion rate associated with the query advertisement pair. A high conversion rate may indicate a strong link between the query q and the advertisement a. Query/ad pairs with higher conversion rates may be considered more significant than those with lower conversion rates.

The conversion rate may be used to calculate the reliability factor separate from, or in addition to, using the clicks. For example, a query/ad pair with a low number of clicks may still be reliable if it has a high conversion rate. Once the rf factor due to conversions is determined it may be applied to the following equation to adjust the weight:

w(q,a,D)=w(q,a,D)*rf.

After calculating a weight for the link (q, a) and/or a weight for each DUDE state D that exists for (q, a), the system 300 may move to block 730. At block 730 the graph processor 322 may add the weights to the data entry representing the link (q, a). At block 735 the graph processor 322 may store the data representing the link (q, a), including the weights, in the graph data store 326. If the query/ad pair was not unique in block 715, the system 300 may move to block 740.

At block 740 the graph processor 322 may determine whether there area any additional query/ad pairs. If there are additional query/ad pairs the system 300 may move to block 745. At block 745 the graph processor 322 may select the next query/ad pair. The system 300 may then move to block 715 and repeat the operations for the query ad/pair. The graph processor 322 may repeat the operations for each query/ad pair identified in the graph data store 326.

Figure 8:
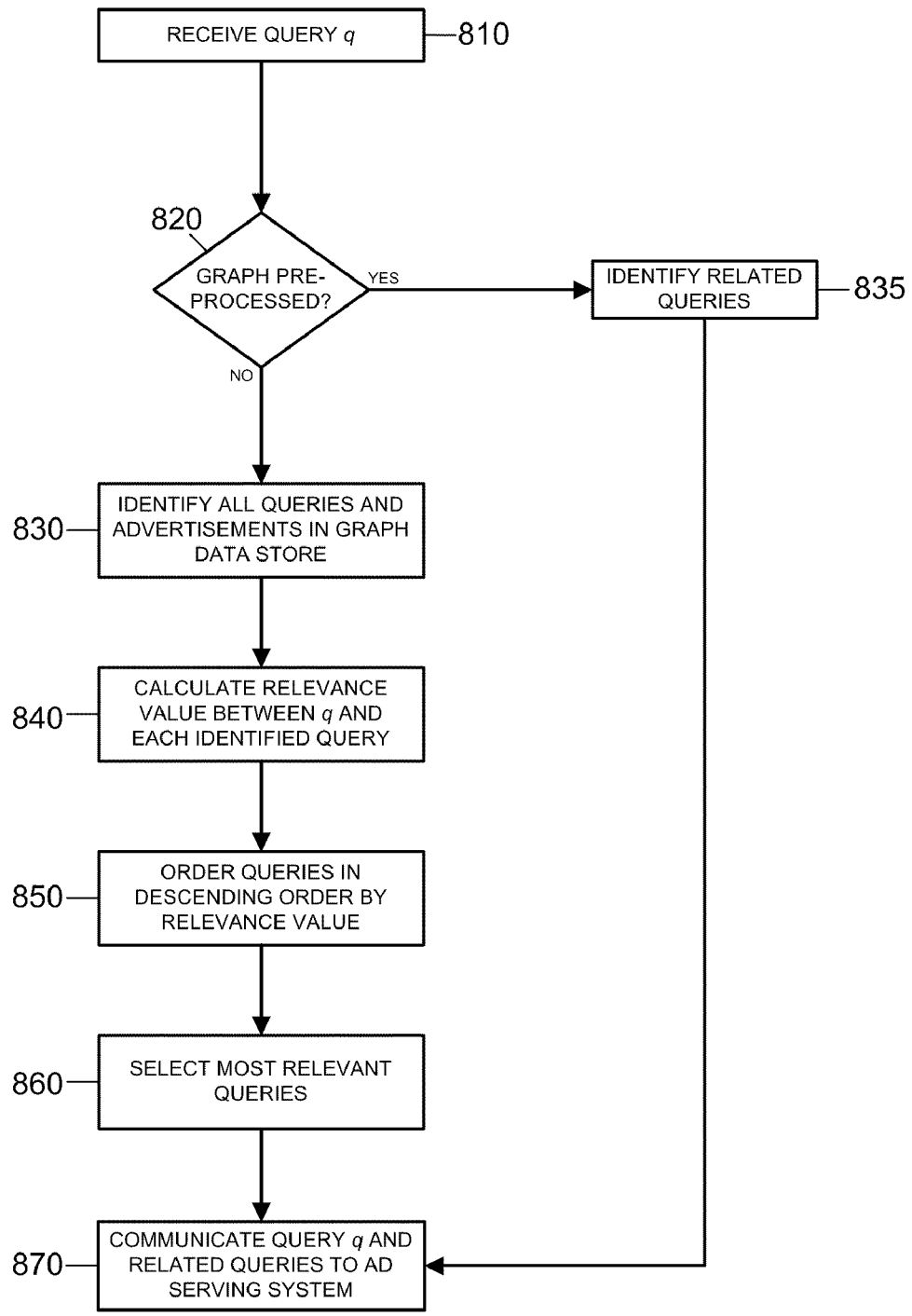
FIG. 8 is a flowchart illustrating the use of a network of users and advertisers, built by the system of FIG. 3 or other systems for generating query suggestions using a network of users and advertisers, to suggest queries related to a query.

FIG. 8 is a flow chart illustrating the operations of using a network of users and advertisers built by the system of FIG. 3, or other systems for generating query suggestions using a network of users and advertisers, to suggest queries related to a query q. At block 810 the graph component 320 may receive a query q, such as from the service provider server 240. The query q may have been searched for by one of the users 120A-N, such as the user A 120A. Links between the query q and advertisements may exist in the graph data store 326. The query q may be communicated to the graph analyzer 324.

At block 820 the graph analyzer 324 may determine whether the graph data representing the query/advertisement graph was pre-processed. The graph may be pre-processed offline to build all of the outputs that the graph may be utilized to generate, such as queries related to a query q. The outputs for a given query may be stored in a hashmap to enable a quick and efficient lookup of the data. In very large implementations of the system 300 the processing delay may require calculating any potential outputs offline. The steps that follow may be performed offline if the graph data is pre-processed.

If the graph data was not pre-processed the system 300 may move to block 830. At block 830 the graph analyzer 324 may identify all queries Q and all advertisements A which are a part of a link in the graph data store 326. At block 840 the graph analyzer 324 may calculate a relevance value R for each query in Q. The relevance may indicate how relevant each query in Q is to the query q received from the service provider server 240. For a given query q' in Q, the relevance value R for (q, q') may be determined by the following equation:

$$R(q, q') = \frac{\sum_{a \in A} (w(q, a, D_q) - \overline{W}_q) \cdot (w(q', a, D_{q'}) - \overline{W}_{q'})}{\sqrt{\sum_{a \in A_q} (w(q, a, D_q) - \overline{W}_q)^2} \sqrt{\sum_{a \in A_{q'}} (w(q', a, D_{q'}) - \overline{W}_{q'})^2}}.$$

In R(q, q'), Dq may be the DUDE state of (q, a) and Dq' may be the DUDE state of (q', a). The graph analyzer 324 may obtain the weights, w(q,a,D), from the graph data store 326. $\overline{W}_q$ may be the weight value for the position normalized click through rate as calculated by:

$$w(q, a, D) = COEC(q, a, D) = \frac{\text{Clicks}(q, a, D)}{I(q, a, D) \cdot \text{refCTR}(D, r)}.$$

Alternatively or in addition $\overline{W}_q$ may be calculated by:

$$\overline{W}(a) = \frac{\sum_{q \in Q_a, D} \text{Clicks}(q, a) \cdot COEC(q, a, D)}{\sum_{q \in Q_a, D} \text{Clicks}(q, a)}.$$

Alternatively or in addition, in some situations, such as when the distribution scales of the weights are relatively equal, the relevance value R of (q, q') may be determined by:

$$R(q, q') = \frac{\sum_{a \in A} (w(q, a, D_q)) \cdot (w(q', a, D_{q'}))}{\sqrt{\sum_{a \in A_q} (w(q, a, D_q))^2} \sqrt{\sum_{a \in A_{q'}} (w(q', a, D_{q'}))^2}}.$$

The value of R(q, q') may be further enhanced by including an overlap factor OF. The overlap factor OF may describe the number of advertisements the queries q and q' may have in common and/or the amount of search traffic the queries q and q' may have in common. For example a query q may link to 10 advertisements, a query q' may link to 5 advertisements, and the queries q and q' may share 3 advertisements in common. The value of R(q, q') may then be adjusted by the following calculation:

$$R(q, q') = R(q, q') * OF$$

After calculating R(q, q') for every q' in Q, the system 300 may move to block 850. At block 850 the graph analyzer 324 may order the queries in Q in descending order based on their R(q, q') value. At block 860 the graph analyzer 324 may select the top N queries with the highest R(q, q'), where N is any number, such as five. Alternatively or in addition the service provider server 240 may identify the number of queries to be selected.

If the graph analyzer 324 determined that the graph was pre-processed at block 820, the system 300 may move to 835. If the graph was pre-processed, the steps of blocks 830, 840, 850 and 860 may have been performed offline. The N most relevant queries may have been stored in a data structure, such as a hash map, keyed by the query q. The offline processing may have generated a hash map for every q in Q. Thus when a query q is received, the graph analyzer 324 only needs to perform a quick lookup to identify the queries most relevant to q. At block 835 the graph analyzer 324 may perform a lookup to identify the queries most related to the query q.

At block 870 the graph analyzer 324 may communicate the original query q and the N most relevant queries to the ad serving system 310. The ad serving system 310 may mark the relevant queries as suggested queries from the query/advertisement network. Thus the match type of the suggested queries may be the query/advertisement network. The ad serving system 310 may serve advertisements which bid on the suggested queries in addition to those which bid on the query q of the user A 120A. The suggested queries may also be communicated to the service provider 240. The service provider 240 may include the suggested queries on the search results page. The suggested queries may assist the user A 120A in their search.

Figure 9:
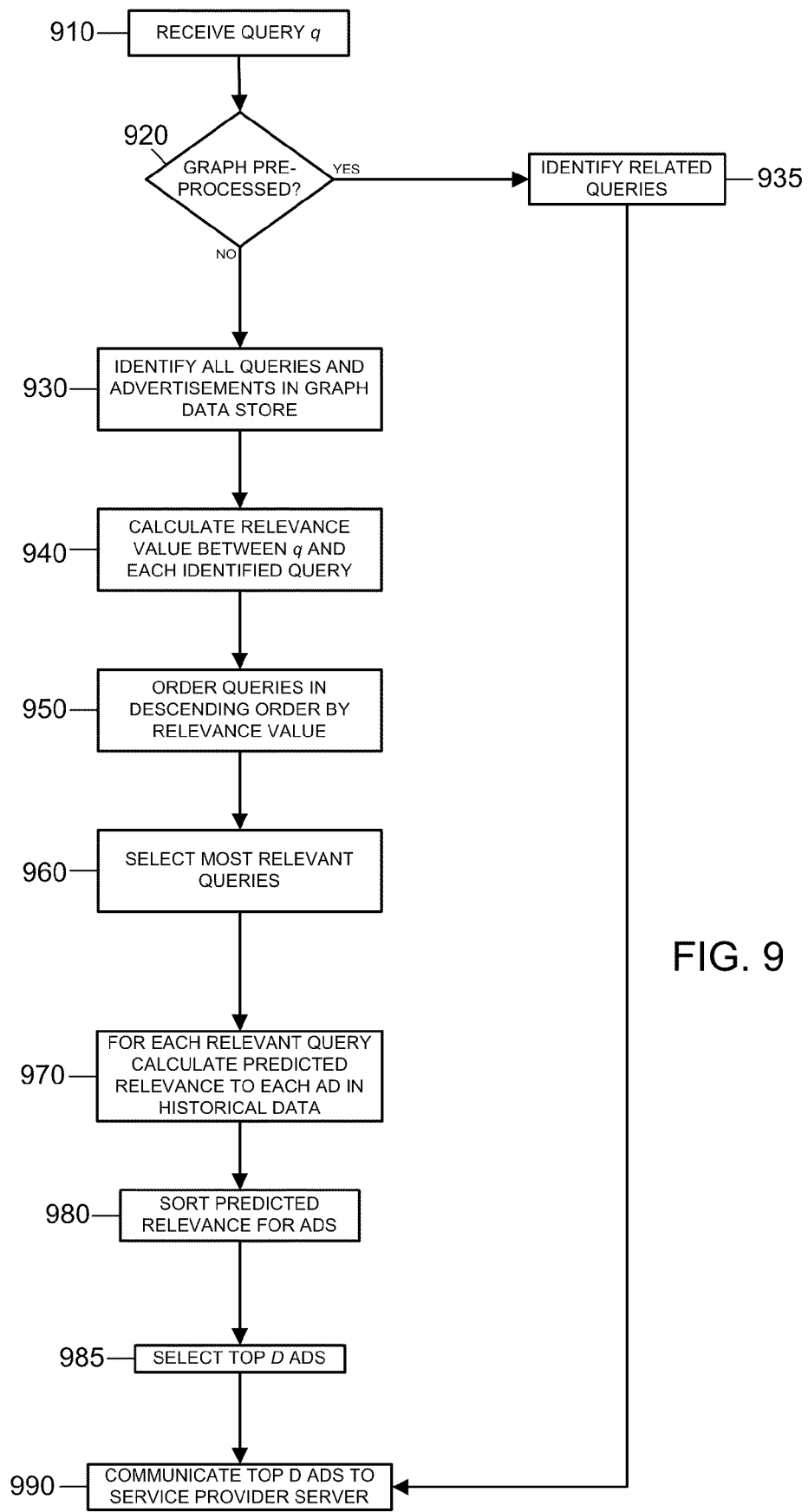
FIG. 9 is a flowchart illustrating the use of a data structure representing a network of users and advertisers, built by the system of FIG. 3 or other systems for generating query suggestions using a network of users and advertisers, to determine ad listings relevant to a query.

FIG. 9 is a flow chart illustrating the operations of using a network of users and advertisers built by the system of FIG. 3, or other systems for generating query suggestions using a network of users and advertisers, to determine the advertisements most relevant to a query q. At block 810 the graph component 320 may receive a query q, such as from the service provider server 240. The query q may have been searched for by one of the users 120A-N, such as the user A 120A or the query q may be a set of terms related to content on a page displayed to the user A 120A. Links between the query q and advertisements may exist in the graph data store 326. The query q may be communicated to the graph analyzer 324.

At block 920 the graph analyzer 324 may determine whether the graph data representing the query/advertisement graph was pre-processed. The graph may be pre-processed offline to determine all of the outputs that the graph may be utilized to generate, such as the most relevant advertisements for a query q. The outputs for a given query may be stored in a hashmap to enable quick and efficient lookup of the data. In very large implementations of the system 300 the processing time may require calculating outputs offline. The steps that follow may be performed offline if the graph data is pre-processed.

If the graph data was not pre-processed the system 300 may move to block 930. At block 930 the graph analyzer 324 may identify all queries Q and all advertisements A which are a part of a link in the graph data store 326. At block 940 the graph analyzer 324 may calculate a relevance value R for each query q' in Q. The relevance may indicate how relevant each query is to the query q received from the service provider server 240. For a given query q' in Q, the relevance value R of (q, q') may be determined by:

$$R(q, q') = \frac{\sum_{a \in A} (w(q, a, D_q) - \overline{W}_q) \cdot (w(q', a, D_{q'}) - \overline{W}_{q'})}{\sqrt{\sum_{a \in A_q} (w(q, a, D_q) - \overline{W}_q)^2} \sqrt{\sum_{a \in A_{q'}} (w(q', a, D_{q'}) - \overline{W}_{q'})^2}}.$$

In R(q, q'), Dq may be the DUDE state of (q, a) and Dq' may be the DUDE state of (q', a). The graph analyzer 324 may obtain the weights, w(q,a,D), from the graph data store 326. $\overline{W}_q$ may represent the weight value for the position normalized click through rate calculated by:

$$w(q, a, D) = COEC(q, a, D) = \frac{\text{Clicks}(q, a, D)}{I(q, a, D) \cdot \text{refCTR}(D, r)}.$$

Alternatively or in addition $\overline{W}_q$ may be calculated by:

$$\overline{W}(a) = \frac{\sum_{q \in Q_a, D} \text{Clicks}(q, a) \cdot COEC(q, a, D)}{\sum_{q \in Q_a, D} \text{Clicks}(q, a)}.$$

Alternatively or in addition, in some situations, such as when the distribution scales of the weights are relatively equal, the relevance value R of (q, q') may be determined by:

$$R(q, q') = \frac{\sum_{a \in A}(w(q, a, D_q)) \cdot (w(q', a, D_{q'}))}{\sqrt{\sum_{a \in A_q}(w(q, a, D_q))^2} \sqrt{\sum_{a \in A_{q'}}(w(q', a, D_{q'}))^2}}.$$

After calculating R(q, q') for every q' in Q, the system 300 may move to block 950. At block 950 the graph analyzer 324 may order the queries in Q in descending order based on their R(q, q') value. At block 960 the graph analyzer 324 may select the top K queries with the highest R(q, q'), where K may be any number, such as five.

At block 970 the graph analyzer 324 may use the top K queries, represented by q1, . . . , qK, to calculate a predicted relevance between q and each advertisement a existing in A. The graph analyzer may use the following formula to calculate the predicted relevance $\hat{w}(q,a)$ for each a in A:

$$\hat{w}(q, a) = \frac{\sum_{k=1}^{K} R(q_k, q) \cdot w(q_k, a)}{\sum_{k=1}^{K} |R(q_k, q)|}.$$

The values for $R(q_k, q)$ may have previously been calculated at block 940. The values for $w(q_k, a)$ may be stored in the graph data store 326.

Alternatively or in addition, the mean of the relevance weight distribution may be decoupled from the estimation and the mean may be added back into the final prediction as follows:

$$\hat{w}(q^*, a^*) = \overline{W}_{q^*} + \frac{\sum_{k=1}^{K} R(q_k, q^*) \cdot (w(q_k, a^*) - \overline{W}_{q_k})}{\sum_{k=1}^{K} |R(q_k, q^*)|}.$$

$\overline{W}_q$ may be the weight value for the position normalized click through rate and may be determined by:

$$w(q, a, D) = COEC(q, a, D) = \frac{\text{Clicks}(q, a, D)}{I(q, a, D) \cdot refCTR(D, r)}.$$

Once the predicted relevance $\hat{w}(q,a)$ has been calculated for each a in A, the system 300 may move to block 980. At block 980 the graph analyzer 324 may sort, in descending order, the predicted relevances $\hat{w}(q,a)$ for each a in A. At block 985 the top D advertisements most relevant to the query q may be selected, where D may be any number, such as five.

If at block 920 the graph was pre-processed the system 300 may move to 935. If the graph was pre-processed, the steps of blocks 930, 940, 950, 960, 970, and 980, and 985 may have been performed offline. The most relevant advertisements may have been stored in a data structure, such as a hash map, keyed by the query q. The offline processing may have generated a hash map for every q in Q. Thus when a query q is received, the graph analyzer 324 only needs to perform a quick lookup to identify the advertisements most relevant to q. At block 935 the graph analyzer 324 may perform a lookup on the data structure to identify the top D advertisements most relevant to the query q, where D may be any number, such as five.

At block 990 the graph analyzer 324 may communicate the original query q and the advertisements most relevant to q to the service provider server 240 and/or the ad serving system 310. The ad serving system 310 may use the most relevant advertisements to supplement advertisements bid on for the query q. Alternatively or in addition the graph analyzer 324 may communicate the most relevant advertisements directly to the service provider server 240. In this case the service provider server 240 may only include the advertisements identified by the graph analyzer 324 in the search results of the user A 120A and bypass the ad serving system 310.

Figure 10:
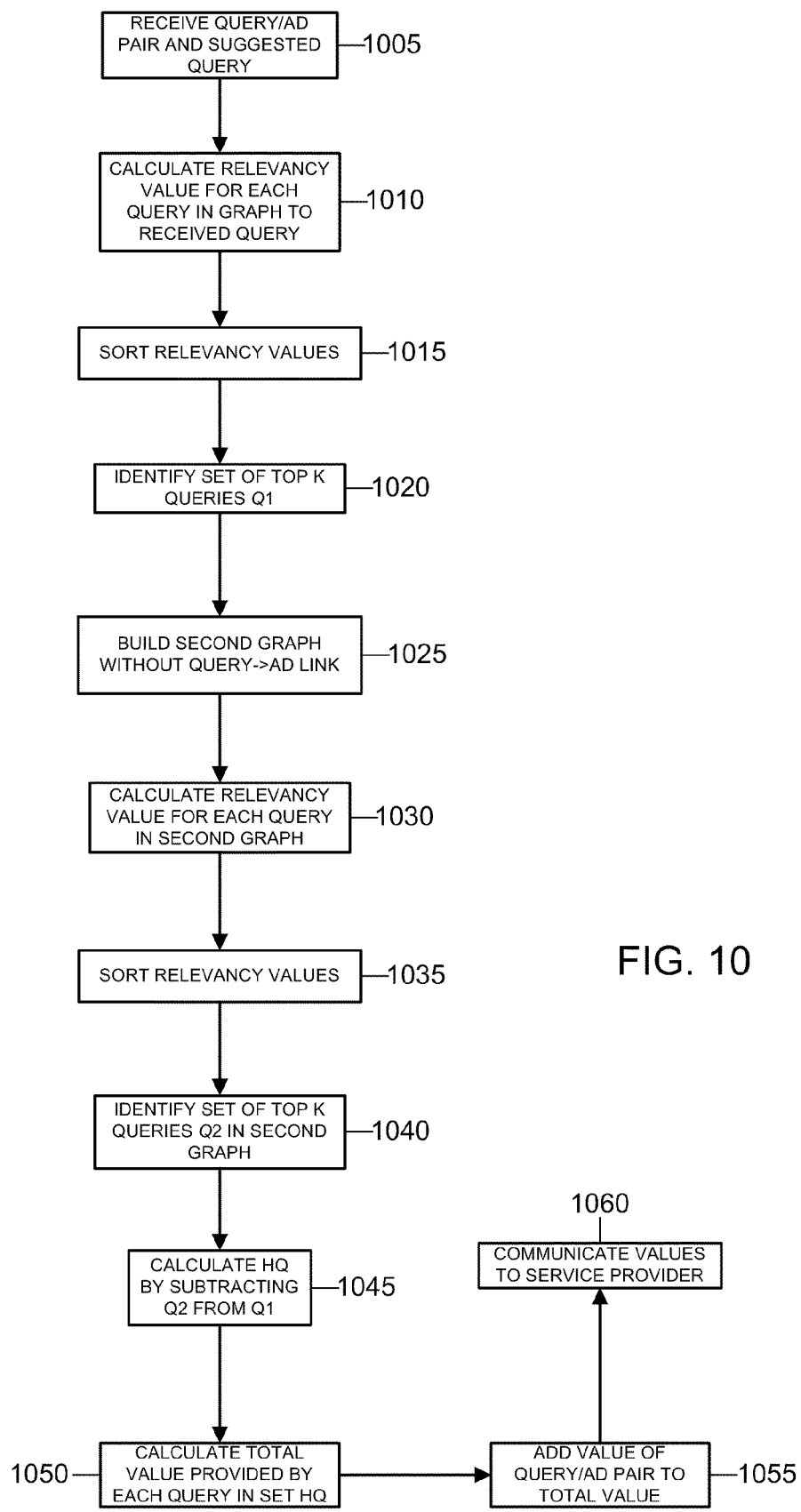
FIG. 10 is a flowchart illustrating the use of a data structure representing a network of users and advertisers, built by the system of FIG. 3 or other systems for generating query suggestions using a network of users and advertisers, to determine the value of a suggested query.

FIG. 10 is a flow chart illustrating the operations of using a network of users and advertisers built by the system of FIG. 3, or other systems for generating query suggestions using a network of users and advertisers, to determine the value attributed to a suggested query. Determining the value attributed to a suggested query may assist the revenue generators 110A-N in optimizing their advertising campaigns by identifying the most profitable queries. Alternatively or in addition to the value attributed to a suggested query may indicate queries related to content on a page. The revenue generators 110A-N may then focus their advertising campaigns on the most profitable queries. The service provider 130 may provide the revenue generators 110A-N with reports indicating the effectiveness or value of each of the queries they bid on. The reports may further indicate the value of each query attributed to keyword suggestions and/or matching systems. In some instances the revenue generators 110A-N may not have been bidding on the suggested keywords and may modify their advertising campaigns to include bids on the suggested keywords.

At block 1005 the graph analyzer 324 may receive a query/ad link (q, a) and a suggested query q' for the link (q, a). The suggested query q' may have been previously suggested for q resulting in the advertisement a being displayed to one of the users 120A-N. Thus the link (q,a) may have a raw context stored in the graph data store 326 that includes query suggestion q' and match type M. The service provider server 240 may have communicated (q, a) and q' to the graph analyzer 324.

At block 1010 the graph analyzer 324 may identify all queries Q identified in the link data stored on the graph data store 326. The graph analyzer 324 may calculate the relevance values R(q, q") for q and all q" in Q, such as every query in Q. After calculating the relevance values for all the queries, the system 300 may move to block 1015. At block 1015 the graph analyzer 324 may sort the queries q" in descending order based on their relevance values R(q, q"). At block 1020 the graph analyzer 324 may identify the top K queries, where K is any number, such as five. The graph analyzer 324 may place the top K queries into a set, Q1($q$). The steps described in blocks 1010, 1015 and 1020 may be described in more detail in FIGS. 8 and 9 above.

At block 1025 the graph analyzer 324 may create a second build of the graph without the link (q, a). If neither q nor a are part of any other link, then the second build does not have to be performed. At block 1030 the graph analyzer 324 may calculate the relevancy values R(q, q") based on the second build of the graph for all q" which may be an element of Q. At block 1035 the graph analyzer 324 may sort the queries in descending order based on their relevance values R(q, q"). At block 1040 the graph analyzer 324 may identify the top K queries from the second build, where K is any number, such as five. The graph analyzer 324 may place the top K queries from the second build into a second set, Q2(*q*). The steps described in blocks 1030, 1035 and 1040 may be described in more detail in FIGS. 8 and 9 above.

At block 1045 the graph analyzer 324 may determine a set of queries HQ(q), calculated by Q1(*q*)–Q2(*q*). If neither q nor a are part of any other link, and the second build was not performed, then HQ(q)=Q1(*q*).

At block 1050 the graph analyzer 324 may calculate the residual value of the link $\ddot{v}$(q,a), or the summation of the value attributed to each query in HQ(q). The value of each query in HQ(q) may be calculated by: v(q,a)=w(q,a)·ppc(q,a). The weights of w(q,a) may be total clicks or position normalized CTR. When the value of the weight is total clicks, the measure of value may be simply a count of the total aggregated revenue brought by the link over the time period T. Alternatively or in addition the conversion rates may be used instead of ppc. Thus the $\ddot{v}$(q,a) for the graph G stored in the graph data store may be calculated by:

$$\ddot{v}(q, a, G) = \sum_{k \in HQ(q,a)} v(k, a).$$

At block 1055 the graph analyzer 324 may add the value of (q,a) to $\ddot{v}$(q,a,G) the total value provided by each query in the set HQ(q). The calculation may be represented as: ζ(q',(q,a), M)=v((q,a))+$\ddot{v}$((q,a),G), and the result may be the value attributed to the suggestion q' for q with match type M.

At block 1060 the graph analyzer 324 may communicate the value attributed to the suggested query q' to the service provider server 240. The service provider server 240 may display the value to one of the revenue generators 110A-N along with other data describing the effectiveness of their advertising campaigns. The revenue generators 110A-N may be able to improve their advertising campaign by directly targeting suggested keywords with high attributed values.

Figure 11:
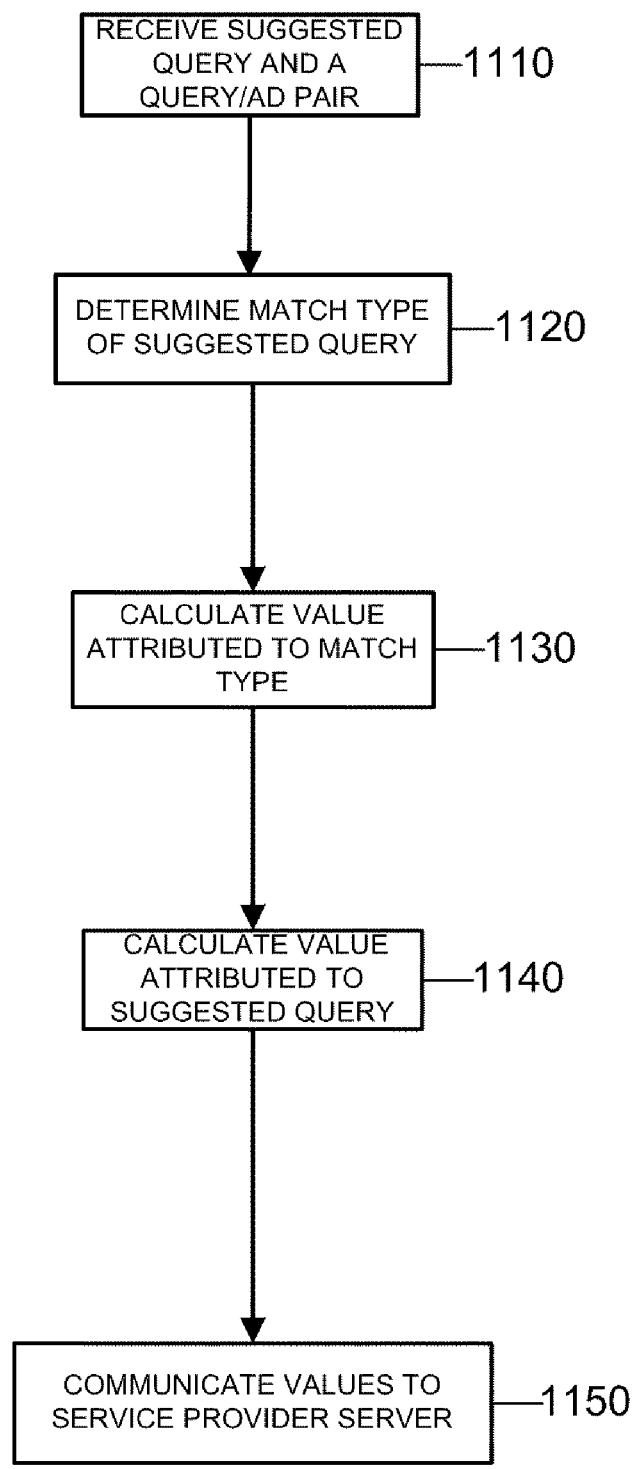
FIG. 11 is a flowchart illustrating the use of a data structure representing a network of users and advertisers, built by the system of FIG. 3 or other systems for generating query suggestions using a network of users and advertisers, to determine the value of a matching system and a suggested query.

FIG. 11 is a flow chart illustrating the steps of using a network of users and advertisers built by the system of FIG. 3, or other systems for generating query suggestions using a network of users and advertisers, to determine the value attributed to a match type and a suggested query. The operations illustrated in the flowchart of FIG. 11 may require less computational complexity to determine the value attributed to a suggested query than the operations illustrated in the flowchart of FIG. 10.

The service provider 130 may be able to determine the values attributed to each of the matching systems implemented in the ad serving system 300. The service provider 130 may be able to optimize ad serving by identifying the best performing matching systems and the worst performing matching systems. The best performing matching systems may be used more often and the poorly performing matching systems may be slowly phased out. At block 1110 the graph analyzer 324 may receive a query/ad link (q, a) and a suggested query q' for the link (q, a). The suggested query q' may have been previously suggested for q, resulting in the advertisement a being displayed to one of the users 120A-N. Thus the link (q,a) may have a raw context data stored in the graph data store 326 that includes query suggestion q' and match type M. The service provider server 240 may have communicated (q, a) and q' to the graph analyzer 324.

At block 1120 the graph analyzer 324 may determine the match type M of the suggested query q'. The match type may be obtained from the raw context data of the query/ad link (q, a). At block 1130 the query analyzer may calculate the average residual value for the link (q, a) attributed to the match type M. The value attributed to the match type M may be calculated by:

$$\zeta(M) = \frac{1}{E} \sum_{((q,a),q')} \zeta(q', (q, a), M),$$

where E is the total number of raw content for (q, a) with match type M. The calculation of ζ(q',(q,a),M) may be elaborated in more detail in the operations illustrated in the flowchart of FIG. 10.

At block 1140 the graph analyzer 324 may calculate the value attributed to the suggested query q' for the link (q, a). The value may be calculated by: ζ(q',(q,a))=v(q,a)+ζ(M). Details on the calculation of v(q,a) may be found in the operations of the flowchart illustrated in FIG. 10. At block 1150 the graph analyzer 324 may communicate the average residual value attributed to the match type M for the link (q,a) and the value attributed to the keyword suggestion q' for q with match type M to the service provider server 240.

Figure 12:
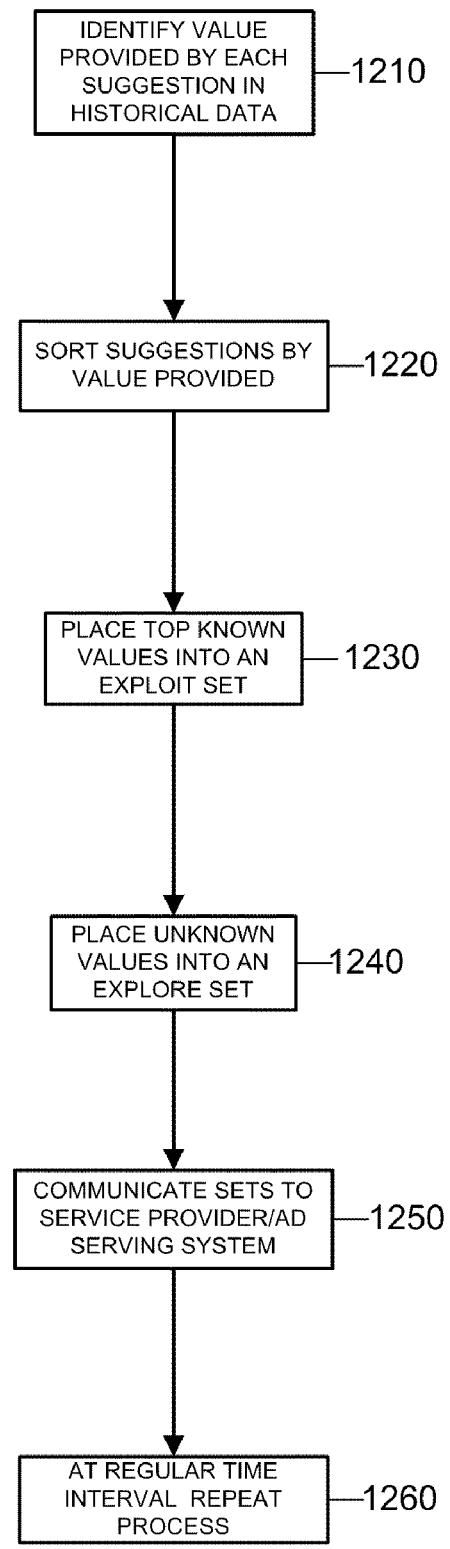
FIG. 12 is a flowchart illustrating the use of a data structure representing a network of users and advertisers, built by the system of FIG. 3 or other systems for generating query suggestions using a network of users and advertisers, by integrating valuable query suggestions with experimental query suggestions.

FIG. 12 is a flow chart illustrating the steps of using a network of users and advertisers built by the system of FIG. 3, or other systems for generating query suggestions using a network of users and advertisers, by integrating valuable suggestions with experimental or unknown suggestions. The service provider 130 may benefit from identifying the best performing suggestions and suggesting them at a higher rate than lower performing suggestions. Furthermore there may be valuable queries that are not suggested because they may be new, obscure, or otherwise have not been exposed to a large amount of traffic. The service provider 130 may benefit from experimenting with these terms to determine if any of them may be profitable.

The query suggestions stored in the graph data store 326 may be separated into two sets, one where the value is known and another where the value is unknown. A suggestion may have a known value if the value is non-zero and the suggestion has been exposed to a minimal amount of traffic, i.e., its impression count exceeds some minimum threshold. At block 1210 the graph analyzer 324 may calculate the value provided by each suggestion in the graph historical dataset. The value of the suggestions may be calculated via the methods outline in FIGS. 10 and 11, namely through the equation: ζ(q',(q,a))=v(q,a)+ζ(M). Alternatively or in addition the value may be defined by relevance, or weight, such as total clicks or conversions.

At block 1220 the graph analyzer 324 may sort the suggestions based on their attributed values calculated above. At block 1230, the graph analyzer 324 may place the suggestions with the top K known values into an exploit set, where K is any number, such as fifty. At block 1240 the graph analyzer 324 may place unknown values, such as the next J values, into an explore set. The explore set may include suggestions with unknown values or suggestions with known values without enough traffic exposure. The explore set may allow the system 300 to experiment with past and new suggestions from any match type. The cardinality of the explore set may be orders of magnitude larger than that of the exploit set. Suggestions in the explore set may be scored for relevance or value, such as by any of the aforementioned methods of valuing suggestions.

The explore set may be separated into two subsets, a live set and an offline set. The live set may be the explore suggestions that are in trial, or under experimentation. The offline set may be suggestions that are not currently being used.

At block 1250 the graph analyzer 324 may communicate the sets of queries to the service provider server 240, and/or the ad serving system 310. The service provider server 240 and/or the ad serving system may suggest the suggestions from the exploit set and the explore-live set. The exploit set may be suggested more frequently than the explore-live set to benefit from the proven value provided by the exploit set.

At block 1260, the graph analyzer 324 may repeat the operations after an interval of time T has passed. The operations may be continually repeated at the interval of time T. The suggestions may be re-valued and re-sorted. Top valued suggestions with sufficient exposure may comprise the exploit set. The live explore set may be populated with a new batch of suggestions with unknown values. The continual update of the exploit set and the explore-live set may ensure that the exploit set captures any seasonal queries or other queries whose value may increase due to temporal externalities.

FIG. 13 illustrates an exemplary page 1300 displaying advertisements. The page 1300 may be served by the service provider 130 to the users 120A-N and may be a web page displayed on the Internet. The page 1300 may include content 1310, such as a list of search results, which may generally be the purpose of the page. The page 1300 may be shown with slots for four advertisements. There may be two top ad slots 1320, 1330 and two side ad slots 1340, 1350. The number of ads in the top ad slots 1320, 1330 may determine the DUDE state of the query. The service provider 130 may attempt to fill the ad slots 1320, 1330, 1340, 1350 with advertisements from the sponsored search server 312, or from the graph analyzer 324.

FIG. 14 is a screenshot of a page 1400 displaying advertisements to the users 120A-N served from a search engine marketing system implementing a system for generating query suggestions using a network of users and advertisers. The page 1400 may be displayed to one of the users 120A-N, such as the user A 120A, when the user A 120A searches for the term "plasma." The page 1400 may include a search query 1405, content 1410, query suggestions 1460, top ads 1420, side ads 1430 and a popup ad 1470. The content 1410 may include a search results list 1440 based on the search query 1405 submitted by the user A 120A, such as "plasma". The search results list 1440 may include one or more search results 1450. A search result 1450 may include a title link 1452, a URL 1454, a description 1456 and a rank 1458. The top ads 1420 may include one or more sponsor listings 1422. The side ads 1430 may include sponsored listings. The query suggestions 1460 may represent queries that were suggested by the query analyzer 324. The queries may represent phrases similar to the search query 1405 that users 120A-N searched for. The query suggestions 1460 may have been generated by the system of FIG. 3.

The title link 1452 may be a clickable link that may reference a site. If one the users 120A-N, such as the user A 120A, clicks on the title link 1452, the user A 120A may be forwarded to the site referred to by the title link 1452. The site referred to by the title link 1452 may be described in the description 1456. The URL 1454 may represent the URL of the site referred to by the link 1452. The rank 1458 may represent the order of the search result 750 in the search results list 1440.

The top ads 1420 and the side ads 3140 may include any combination of sponsored listings, banner ads and popup ads. The top ads 1420 and the side ads 1430s may represent advertisements that may have been retrieved from the sponsored search server 312, the content match server 316 or the graph analyzer 324. The number of ads in the top ads 1420 may indicate the DUDE state of the query. The sponsored listing 1422 and/or the banner ad 1424 may link the users 120A-N to the web site of a revenue generator, such as the revenue generator A 110A, when the users 120A-N click on the banner ad 1424 and/or the sponsored listing 1422. The banner ad 1424 may be constructed from an image (GIF, JPEG, PNG), a JavaScript program or a multimedia object employing technologies such as Java, Shockwave or Flash. The banner ad 1424 may employ animation, video, or sound to maximize presence. The images used in the banner ad 1424 may be in a high-aspect ratio shape (i.e. either wide and short, or tall and narrow).

The popup ad 1470 may link the users 120A-N to the web site of a revenue generator, such as the revenue generator A 110A, when the users 120A-N click on the popup ad 1470. The popup ad 1470 may be constructed from an image (GIF, JPEG, PNG), a JavaScript program or a multimedia object employing technologies such as Java, Shockwave or Flash. The popup ad 1470 may employ animation, video, or sound to maximize presence. The popup ad 1470 may run in the same window as the page, or may open in a new window. The popup ad 1470 may be capable of being closed and/or minimized by clicking on an 'X' in the corner of the popup ad 1470.

FIG. 15 illustrates a general computer system 1500, which may represent a service provider server 240, a third party server 250, an advertising services server 260, a graph component 320, a graph processor 322, a graph analyzer 324 or any of the other computing devices referenced herein. The computer system 1500 may include a set of instructions 1524 that may be executed to cause the computer system 1500 to perform any one or more of the methods or computer based functions disclosed herein. The computer system 1500 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 1500 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions 1524 (sequential or otherwise) that specify actions to be taken by that machine. In a particular embodiment, the computer system 1500 may be implemented using electronic devices that provide voice, video or data communication. Further, while a single computer system 1500 may be illustrated, the term "system" shall also be taken to include any collection of systems or subsystems that individually or jointly execute a set, or multiple sets, of instructions to perform one or more computer functions.

As illustrated in FIG. 15, the computer system 1500 may include a processor 1502, such as, a central processing unit (CPU), a graphics processing unit (GPU), or both. The processor 1502 may be a component in a variety of systems. For example, the processor 1502 may be part of a standard personal computer or a workstation. The processor 1502 may be one or more general processors, digital signal processors, application specific integrated circuits, field programmable gate arrays, servers, networks, digital circuits, analog circuits, combinations thereof, or other now known or later developed devices for analyzing and processing data. The processor 1502 may implement a software program, such as code generated manually (i.e., programmed).

The computer system 1500 may include a memory 1504 that can communicate via a bus 1508. The memory 1504 may be a main memory, a static memory, or a dynamic memory. The memory 1504 may include, but may not be limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one case, the memory 1504 may include a cache or random access memory for the processor 1502. Alternatively or in addition, the memory 1504 may be separate from the processor 1502, such as a cache memory of a processor, the system memory, or other memory. The memory 1504 may be an external storage device or database for storing data. Examples may include a hard drive, compact disc ("CD"), digital video disc ("DVD"), memory card, memory stick, floppy disc, universal serial bus ("USB") memory device, or any other device operative to store data. The memory 1504 may be operable to store instructions 1524 executable by the processor 1502. The functions, acts or tasks illustrated in the figures or described herein may be performed by the programmed processor 1502 executing the instructions 1524 stored in the memory 1504. The functions, acts or tasks may be independent of the particular type of instructions set, storage media, processor or processing strategy and may be performed by software, hardware, integrated circuits, firmware, micro-code and the like, operating alone or in combination. Likewise, processing strategies may include multiprocessing, multitasking, parallel processing and the like.

The computer system 1500 may further include a display 1514, such as a liquid crystal display (LCD), an organic light emitting diode (OLED), a flat panel display, a solid state display, a cathode ray tube (CRT), a projector, a printer or other now known or later developed display device for outputting determined information. The display 1514 may act as an interface for the user to see the functioning of the processor 1502, or specifically as an interface with the software stored in the memory 1504 or in the drive unit 1506.

Additionally, the computer system 1500 may include an input device 1512 configured to allow a user to interact with any of the components of system 1500. The input device 1512 may be a number pad, a keyboard, or a cursor control device, such as a mouse, or a joystick, touch screen display, remote control or any other device operative to interact with the system 1500.

The computer system 1500 may also include a disk or optical drive unit 1506. The disk drive unit 1506 may include a computer-readable medium 1522 in which one or more sets of instructions 1524, e.g. software, can be embedded. Further, the instructions 1524 may perform one or more of the methods or logic as described herein. The instructions 1524 may reside completely, or at least partially, within the memory 1504 and/or within the processor 1502 during execution by the computer system 1500. The memory 1504 and the processor 1502 also may include computer-readable media as discussed above.

The present disclosure contemplates a computer-readable medium 1522 that includes instructions 1524 or receives and executes instructions 1524 responsive to a propagated signal; so that a device connected to a network 235 may communicate voice, video, audio, images or any other data over the network 235. Further, the instructions 1524 may be transmitted or received over the network 235 via a communication interface 1518. The communication interface 1518 may be a part of the processor 1502 or may be a separate component. The communication interface 1518 may be created in software or may be a physical connection in hardware. The communication interface 1518 may be configured to connect with a network 235, external media, the display 1514, or any other components in system 1500, or combinations thereof. The connection with the network 235 may be a physical connection, such as a wired Ethernet connection or may be established wirelessly as discussed below. Likewise, the additional connections with other components of the system 1500 may be physical connections or may be established wirelessly. In the case of a service provider server 240, a third party server 250, an advertising services server 260, the servers may communicate with users 120A-N and the revenue generators 110A-N through the communication interface 1518.

The network 235 may include wired networks, wireless networks, or combinations thereof. The wireless network may be a cellular telephone network, an 802.11, 802.16, 802.20, or WiMax network. Further, the network 235 may be a public network, such as the Internet, a private network, such as an intranet, or combinations thereof, and may utilize a variety of networking protocols now available or later developed including, but not limited to TCP/IP based networking protocols.

The computer-readable medium 1522 may be a single medium, or the computer-readable medium 1522 may be a single medium or multiple media, such as a centralized or distributed database, and/or associated caches and servers that store one or more sets of instructions. The term "computer-readable medium" may also include any medium that may be capable of storing, encoding or carrying a set of instructions for execution by a processor or that may cause a computer system to perform any one or more of the methods or operations disclosed herein.

The computer-readable medium 1522 may include a solid-state memory such as a memory card or other package that houses one or more non-volatile read-only memories. The computer-readable medium 1522 also may be a random access memory or other volatile re-writable memory. Additionally, the computer-readable medium 1522 may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that may be a tangible storage medium. Accordingly, the disclosure may be considered to include any one or more of a computer-readable medium or a distribution medium and other equivalents and successor media, in which data or instructions may be stored.

Alternatively or in addition, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

The methods described herein may be implemented by software programs executable by a computer system. Further, implementations may include distributed processing, component/object distributed processing, and parallel processing. Alternatively or in addition, virtual computer system processing maybe constructed to implement one or more of the methods or functionality as described herein.

Although components and functions are described that may be implemented in particular embodiments with reference to particular standards and protocols, the components and functions are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, may be apparent to those of skill in the art upon reviewing the description.

The Abstract is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

We claim:

1. A method for generating query suggestions by integrating valuable query suggestions with experimental query suggestions using a network of users and advertisers, the method comprising:

identifying a plurality of query suggestions in a historical dataset, the historical dataset comprising queries searched for by users and advertisements selected by the users after searching for the queries, wherein the query suggestions comprise queries identified as having some relevancy to the queries searched for by the users;

generating, from the historical dataset, a data describing a network comprising a plurality of query items representing queries linked to a plurality of advertisement items representing advertisements;

calculating a query suggestion value for each query suggestion in the plurality of query suggestions using the data describing the network, wherein the query suggestion value of each query suggestion is based on a number of advertisements attributable to each query suggestion which are selected by the users;

ranking the plurality of query suggestions, in descending order, based on the query suggestion value of each query suggestion;

generating a query exploit set and a query explore set, wherein the query exploit set comprises the top N ranked query suggestions and the query explore set comprises the remainder of the query suggestions, further wherein N comprises any integer; and suggesting, by a processor, the query suggestions in the exploit set and the explore set, wherein the query suggestions in the exploit set are suggested more frequently than the query suggestions in the explore set.

2. The method of claim 1 further comprising determining a relevance value for each suggested query in the query explore set.

3. The method of claim 2 further comprising:

ranking the suggested queries in the query explore set based on the relevance value of each suggested query; and suggesting the higher ranked query suggestions more frequently than the lower ranked query suggestions.

4. The method of claim 1 wherein suggesting the query suggestions in the exploit set more frequently than the query suggestions in the explore set further comprises:

suggesting the query suggestions in the exploit set and the query suggestions in the explore set for a period of time T, wherein T comprises any period of time, further wherein the query suggestions in the exploit set are suggested more frequently than the query suggestions in the explore set;

re-generating, after the period of time T elapses, from the historical dataset and a dataset relating to the period of time T, the data describing the network comprising the plurality of query items representing queries linked to the plurality of advertisement items representing advertisements;

re-calculating, after the period of time T, the query suggestion value for each query suggestion in the plurality of query suggestions using the data describing the network;

re-ranking, after the period of time T, the plurality of query suggestions, in descending order, based on the query suggestion value of each query suggestion;

re-generating, after the period of time T, the query exploit set and the query explore set, wherein the query exploit set comprises the top N ranked query suggestions and the query explore set comprises the remainder of the query suggestions, further wherein N comprises any integer; and suggesting the query suggestions in the exploit set and the query suggestions in the explore set, wherein the query suggestions in the exploit set are suggested more frequently than the query suggestions in the explore set.

5. The method of claim 1 wherein each advertisement item in the plurality of advertisement items comprises an online advertisement of an advertiser.

6. The method of claim 5 further comprising linking an advertisement item to a query item in the data describing the network, via a query-advertisement link item, when the historical dataset indicates that a user clicked on the advertisement item after searching for the query item.

7. The method of claim 1 wherein the query suggestions are suggested to a user performing a search query.

8. The method of claim 1 wherein the query suggestions suggested to a data serving system, further wherein the query suggestions are used by the data serving system to identify a set of advertisements to serve to a user.

9. The method of claim 1 further comprising:
splitting the query explore set into an online query explore set and an offline query explore set; and
suggesting the query suggestions in the exploit set and the online explore set, wherein the query suggestions in the exploit set are suggested more frequently than the query suggestions in the online explore set.

10. A method for generating query suggestions by integrating valuable query suggestions with online and offline experimental query suggestions using a network of users and advertisers, the method comprising:
(a) identifying a plurality of query suggestions in a historical dataset, the historical dataset comprising queries searched for by users and advertisements selected by the users after searching for the queries, wherein the query suggestions comprise queries identified as having some relevancy to the queries searched for by the users;
(b) generating, from the historical dataset, a data describing a network comprising a plurality of query items representing queries linked to a plurality of advertisement items representing advertisements;
(c) calculating a query suggestion value for each query suggestion in the plurality of query suggestions using the data describing the network, wherein the query suggestion value of each query suggestion is based on a number of advertisements attributable to each query suggestion which are selected by the users;
(d) ranking the plurality of query suggestions, in descending order, based on the query suggestion value of each query suggestion;
(e) generating a query exploit set comprising the top N ranked query suggestions, wherein N comprises any integer, and a query explore set comprising the remainder of the query suggestions;
(f) calculating a relevance value of each query suggestion in the query explore set;
(g) ranking each query suggestion in the query explore set based on the relevance value of each query suggestion;
(h) generating an online query explore set and an offline query explore set wherein the online query explore set comprises the top half of the ranked query suggestions in the query explore set and the offline query explore set comprises the bottom half of the ranked query suggestions in the query explore set;
(i) suggesting, by a processor, the query suggestions in the exploit set and the online query explore set, wherein the query suggestions in the exploit set are suggested more frequently than the query suggestions in the online query explore set; and
(j) rotating the queries in the offline query explore set and the online query explore set after the passage of a period of time.

11. The method of claim 10 further comprising:
(k) retrieving an updated historical dataset after the passage of a second period of time; and
(l) repeating steps (a)-(k).

12. The method of claim 10 further comprising linking an advertisement item to a query item in the data describing the network when the historical dataset indicates a user clicked on the advertisement item after searching for the query item.

13. The method of claim 10 wherein the query suggestions are associated with a plurality of matching systems.

14. The method of claim 10 wherein the query suggestions are communicated to an advertisement serving system.

15. The method of claim 14 wherein the suggested queries are used by the advertisement serving system to identify a set of advertisements to serve to a user.

16. A system for generating query suggestions by integrating valuable query suggestions with experimental query suggestions using a network of users and advertisers, the system comprising:
a memory to store a historical dataset comprising queries searched for by users and advertisements selected by the users after searching for the queries, a data describing a network comprising a plurality of query items representing queries linked to a plurality of advertisement items representing advertisements, a plurality of query suggestion values, a query exploit set, and a query explore set;
an interface connected to the memory, the interface operative to communicate query suggestions; and
a processor operatively connected to the memory and the interface, the processor operative to identify a plurality of query suggestions in the historical dataset, wherein the query suggestions comprise queries identified as having some relevancy to the queries searched for by the users, generate the data describing the network based on the historical dataset, calculate the query suggestion value for each query suggestion in the plurality of query suggestions using the data describing the network, wherein the query suggestion value of each query suggestion is based on a number of advertisements attributable to each query suggestion which are selected by the users, rank the plurality of query suggestions, in descending order, based on the query suggestion value of each query suggestion, generate a query exploit set comprising the top ranked query suggestions and a query explore set comprising the remainder of the query suggestions and suggest, via the interface, the query suggestions in the exploit set and the explore set, wherein the query suggestions in the exploit set are suggested more frequently than the query suggestions in the explore set.

17. The system of claim 16 wherein the query suggestion are communicated to an advertisement serving system via the interface.

18. The system of claim 16 wherein the processor stores in the memory a subset of the query suggestions in the explore set, further wherein the query suggestions in the subset are not suggested.

19. The system of claim 18 wherein the processor rotates the query suggestions in the subset and the query suggestions in the explore set after a period of time elapses.

20. The system of claim 16 wherein after a second period of time elapses the processor retrieves a second historical dataset, regenerate the data describing the network based on the second historical dataset, recalculates the query suggestion value for each query suggestion using the regenerated network, re-ranks the plurality of query suggestions, in descending order, based on the recalculated query suggestion value of each query suggestion, regenerates a query exploit set comprising the top ranked query suggestions and a query explore set comprising the remainder of the query suggestions and suggests, via the interface, the query suggestions in the regenerated exploit set and the regenerated explore set, wherein the query suggestions in the regenerated exploit set are suggested more frequently than the query suggestions in the regenerated explore set.

* * * * *